US012613111B2

(12) United States Patent
Straubinger et al.

(10) Patent No.: US 12,613,111 B2
(45) Date of Patent: Apr. 28, 2026

(54) DETECTION DEVICE FOR A POSITION SENSOR AND DETECTION SYSTEM COMPRISING SUCH A DETECTION DEVICE

(71) Applicant: SUMIDA COMPONENTS & MODULES GMBH, Obernzell (DE)

(72) Inventors: Franz Straubinger, Aidenbach (DE); Markus Simon, Hutthurm (DE)

(73) Assignee: SUMIDA COMPONENTS & MODULES GMBH, Obernzell (DE)

( * ) Notice: Subject to any disclaimer, the term of this patent is extended or adjusted under 35 U.S.C. 154(b) by 105 days.

(21) Appl. No.: 18/018,477

(22) PCT Filed: Jul. 30, 2021

(86) PCT No.: PCT/EP2021/071452
§ 371 (c)(1),
(2) Date: Jan. 27, 2023

(87) PCT Pub. No.: WO2022/023550
PCT Pub. Date: Feb. 3, 2022

(65) Prior Publication Data
US 2023/0304831 A1      Sep. 28, 2023

(30) Foreign Application Priority Data
Jul. 30, 2020    (DE) ......................... 102020209601.5

(51) Int. Cl.
*G01D 5/22* (2006.01)
*G01B 7/30* (2006.01)

(52) U.S. Cl.
CPC    *G01D 5/22* (2013.01); *G01B 7/30* (2013.01)

(58) Field of Classification Search
CPC ...... G01B 7/30; G01D 5/2053; G01D 5/2073; G01D 5/2086
See application file for complete search history.

(56) References Cited

U.S. PATENT DOCUMENTS 3,085,191 A      4/1963    Sleeper
3,898,635 A  *  8/1975    Kulterman ........... G01D 5/2073
                                                        340/870.24
(Continued)

FOREIGN PATENT DOCUMENTS

DE            19719905  A1    11/1997
DE      102004033691  A1      2/2005
(Continued)

OTHER PUBLICATIONS

International Search Report for Application No. PCT/EP2021/071452, dated Feb. 4, 2022, 7 Pages (including English translation).
(Continued)

*Primary Examiner* — Noam Reisner
(74) *Attorney, Agent, or Firm* — BROOKS KUSHMAN P.C.

(57) ABSTRACT

A detection device for a position sensor and to a detection system comprising such a detection device. The detection device comprises, in some embodiments, at least one primary winding and a secondary winding circuit. The secondary winding circuit has a plurality of secondary windings which are inductively coupled to the at least one primary winding during operation of the detection device, and the plurality of secondary windings is designed as two sinusoidal coils, each having a center tap.

15 Claims, 14 Drawing Sheets

(56) References Cited

U.S. PATENT DOCUMENTS

| | | | |
|---|---|---|---|
| 4,100,480 | A | 7/1978 | Lytle et al. |
| 4,737,698 | A | 4/1988 | McMullin et al. |
| 4,783,626 | A | 11/1988 | Shimizu |
| 5,973,494 | A | 10/1999 | Masreliez et al. |
| 6,011,389 | A * | 1/2000 | Masreliez ............ G01D 5/2053 |
| | | | 324/207.17 |
| 2007/0103150 | A1 | 5/2007 | Tada et al. |
| 2008/0018328 | A1 | 1/2008 | Meyer |
| 2012/0274316 | A1 | 11/2012 | Matsuura et al. |
| 2015/0168349 | A1 | 6/2015 | Reusing |
| 2015/0330812 | A1 * | 11/2015 | Hourne .................. G01D 5/204 |
| | | | 324/207.15 |
| 2015/0362340 | A1 | 12/2015 | Montagne |
| 2016/0131503 | A1 | 5/2016 | Goto et al. |
| 2017/0268907 | A1 | 9/2017 | Lehmann et al. |
| 2019/0017845 | A1 | 1/2019 | Utermoehlen et al. |
| 2020/0400465 | A1 | 12/2020 | Fontanet |
| 2021/0190546 | A1 * | 6/2021 | Lehmann ............ G01D 5/2291 |
| 2022/0021386 | A1 | 1/2022 | Hirono et al. |

FOREIGN PATENT DOCUMENTS

| | | | |
|---|---|---|---|
| DE | 102013226198 | A1 | 6/2015 |
| DE | 102016202877 | B3 | 6/2017 |
| DE | 102017204871 | A1 | 10/2018 |
| DE | 102018213783 | A1 | 2/2020 |
| EP | 1881299 | A1 | 1/2008 |
| FR | 3070759 | A1 | 3/2019 |
| JP | 2007263981 | A1 | 10/2007 |
| JP | 2012233763 | A | 11/2012 |
| JP | 2015135243 | A | 7/2015 |
| WO | 1997019323 | A1 | 5/1997 |
| WO | 2006074560 | A2 | 7/2006 |
| WO | 2020137729 | A1 | 7/2020 |

OTHER PUBLICATIONS

First Office Action for German Application No. 10 2020 209 601.5, dated Aug. 8, 2023, 7 Pages.
Japanese Office Action in JP Application No. 2023-505873 dated Feb. 20, 2024 (20 pages, including English translation).
CNIPA First Office Action in CN Application No. 202180058945.7 dated Jul. 2, 2025 (13 pages, including English translation).
EUIPO Office Action in EP Application No. 21754780.1-1001 dated Feb. 25, 2026 (14 pages, including English translation).

* cited by examiner

DETECTION DEVICE FOR A POSITION SENSOR AND DETECTION SYSTEM COMPRISING SUCH A DETECTION DEVICE

CROSS-REFERENCE TO RELATED APPLICATIONS

This application is a U.S. national phase of PCT Application No. PCT/EP2021/071452 filed Jul. 30, 2021, which claims priority to German Application No. DE 10 2020 209 601.5 filed Jul. 30, 2020, the disclosures of which are incorporated in their entireties by reference herein.

TECHNICAL FIELD

The present disclosure relates to a detection device for a position sensor and a detection system including such a detection device. In particular, the present disclosure relates to a detection device that is used in a position sensor in order to detect an angular position of the sensor element relative to the detection device in combination with a sensor element that is rotatably arranged relative to the detection device.

BACKGROUND

In many technical fields, it is necessary to determine the position of a moving object with an accuracy specified by the respective application. For this purpose, numerous sensor systems have been developed, in which at least the relative position between two elements may be measured with sufficiently high precision by, for example, optical, electrical, magnetic and other interactions. Especially in technical fields where very demanding environmental conditions prevail, such as high operating temperatures in combination with high magnetic fields, which may be caused e.g., by high operating currents, sensor arrangements are often used, in which the position-dependent generation of eddy currents is used to determine the position of a component. For this purpose, in some examples of such an eddy current sensor arrangement, damping of one or more coils caused by eddy currents is detected, wherein the one or more coils are provided as stationary components and a moving component has a track made of a suitable material, which leads to position-dependent eddy current generation and thus damping. Based on this position-dependent eddy current generation, the position of the moving track with respect to the one or more stationary coils may thus be determined by correlating the induced damping and the particular shape of the track.

An exemplary application in this regard is the determination of the position of a rotor of an electrical machine to thereby determine suitable drive signals for supplying appropriate current and voltage values. For example, in many cases where very variable rotational speeds and a moderately wide control bandwidth are required for the electrical machine, it is important to acquire output voltage signals from sensor systems with a high temporal resolution in order to be able to relatively precisely determine the position of the rotor. With regard to an efficient operation of e.g., permanently excited synchronous machines, it is e.g., necessary to know the position of the rotor according to the number of poles within an angular section with good accuracy in order to appropriately energize stator windings so that a desired operation is achieved. Non-contact coil-based sensor arrangements are often used for this purpose, but they require a relatively large installation space for the coils and the associated evaluation electronics. Very close coupling between the sensor element and the rotor in the electrical machine is often required, whereby high currents with correspondingly high magnetic fields and relatively high temperatures occur in the vicinity of the sensor element, leading to interference in the output signals of the coils. This susceptibility to interference ultimately also results in poorer spatial resolution of the position of a rotor. In addition to a desired interference immunity with regard to high magnetic fields, however, with regard to sensor arrangements for electrical machines, an adaptation of the sensor arrangements to the operating conditions of the electrical machine is also desired, for example with regard to the prevailing temperatures, the required speed range, and the like.

In addition to the above aspects, there are requirements for high, consistent precision in the manufacture of sensor arrangements, for example in mass production, irrespective of a specific application with regard to the provision and integration of components of a sensor system. This allows sensor arrangements to function uniformly without the need for time-consuming adjustment work during installation in the end application.

US 2017/0268907 A1 shows a position sensor with a rectangular primary coil surrounding two sinusoidal secondary coils. These coils are formed in a printed circuit board. A position transmitter is further provided here for position determination, whereby a position along a linear movement is determined.

In WO 2006/074560 A2, an eddy current sensor is shown, which is provided on a magnetic bearing device in order to perform a distance measurement on the bearing.

US 2015/0362340 A1 describes a position sensor including a primary coil, several secondary coils and a sensor element. The coils are integrated into a printed circuit board.

In known rotor position sensors, there is a problem in that an offset occurs in signals, output by secondary windings that are not arranged uniformly over a full circle around an axis, due to the necessarily asymmetrical arrangement of the secondary windings around the axis. Furthermore, an offset in the phase signal of rotor position sensors occurs due to the fact that individual windings in rotor position sensors experience different degrees of coupling from neighboring windings, especially when windings are arranged over only a section of a full circle, since outer windings, in contrast to inner windings, have only one neighboring winding. These offsets in signals, caused purely by the arrangement of windings in rotor position sensors, are therefore sources of error that negatively affect the accuracy of rotor position sensors unless compensation is provided.

In view of the prior art described above, it is an object to provide a detection device and a detection system with such a detection device which, despite a compact design, exhibit high precision and low susceptibility to interference.

SUMMARY

The above object is addressed within the scope of the present disclosure by compensating for a phase offset caused in secondary winding circuits of detection devices for position sensors by the fact that not every secondary winding couples to adjacent secondary windings to the same extent. The starting point of the solution is that it was recognized that phase misalignment is caused by the outer secondary windings "seeing" only one adjacent secondary winding, while inner secondary windings "see" adjacent secondary windings on both sides. This means that the secondary windings of a secondary winding circuit have different couplings to adjacent coils because the secondary windings are arranged over only one segment of a circle rather than a full circle, so that each secondary winding "sees" two adjacent windings. In view of an undesirable phase offset, a technical teaching is realized within the scope of the present disclosure, which uniformly compensates for the phase offset in an economical manner, since the phase offset is solved as a single problem by the present disclosure, which thus realize a phase offset compensation.

In a first aspect, a position sensor detection device is provided, such as a rotor position sensor or generally a position sensor that detects not a position of a rotor of an electric machine, but a position of any rotating part, such as a part flanged to a rotor of an electric machine via a gearbox, for example, or a rotating part that rotates only in a limited angular range or continuously. In illustrative embodiments of the first aspect, the detection device includes at least a primary winding and a secondary winding circuit.

In this aspect, the secondary winding circuit includes a plurality of secondary windings inductively coupled to the at least one primary winding. The plurality of secondary windings is configured as two sinusoidal coils, each with a center tap. In this context, "sinusoidal" also means "cosinusoidal" or a general shape obtained by a phase shift of any phase from a sinusoidal curve or a general shape obtained by a continuous deformation of a sinusoidal curve. Furthermore, "sinusoidal" may also apply to a curvilinear shape that corresponds merely to a partial section of a sine or cosine curve or a continuous deformation thereof.

The sinusoidal coils allow in a simple way that a sinusoidal measurement signal is generated using a simple sensor structure in a detection system, for example with a strip-shaped sensor structure with substantially constant width along the sensor structure over one revolution, but the strip has interruptions ensuring that a sinusoidal coil scanning the sensor structure has an overlapping area (i.e., projected onto the strip, i.e., an area of the coil projected onto the strip) between two interruptions, thereby resulting in a monotonically increasing or decreasing signal in the coil as the strip is scanned. The center tap from each sinusoidal coil provides a simple means of tapping across a single secondary winding at a time.

For example, the center tap may be provided as a vertical contact in a printed circuit board if the secondary windings are single or multi-layer sinusoidal planar coils. This means that sinusoidal windings are formed in the form of sinusoidal conductor tracks, or a sinusoidal winding is formed or composed by one or more sinusoidal conductor track sections. A center tap is then formed in this case as a vertical contact in the printed circuit board, for example in the form of one or more vias, which divides a sinusoidal conductor track section centrally into two subsections or divides two subsections, which have a sinusoidal shape in plan view, into two track sections of essentially the same length. Here, "essentially" may indicate a tolerance of at most 40% in a length of a track section, preferably at most 30% or at most 20% or at most 10%, further preferably at most 5%. Different layers may be interconnected at the center tap of a multilayer winding.

In a first embodiment of this aspect, the primary winding may be formed as a rectangular coil surrounding the plurality of secondary windings in plan view.

This provides advantageous coupling between the primary winding and the secondary windings.

In a second embodiment of this aspect, the plurality of secondary windings may include a first subset of at least two secondary windings arranged in series with each other and a second subset of at least two secondary windings arranged in series with each other. This allows for a differential circuit arrangement of secondary windings in each subset. In this case, the detection device may further include a resistor or capacitor. For example, the resistor or capacitor may now be arranged between a secondary winding from the first subset and a secondary winding from the second subset and/or it may be arranged in parallel with a first secondary winding from the first subset, possibly with a second resistor or capacitor that may be arranged in parallel with a first secondary winding from the second subset. Here, on the one hand, phase balancing between the individual subsets may be achieved by the resistor or capacitor between a secondary winding from the first subset and a secondary winding from the second subset, and on the other hand, offset balancing may possibly be achieved by the resistor or capacitor in parallel arrangement with the first secondary winding from the first subset, possibly with the second resistor or capacitor in parallel arrangement with the first secondary winding from the second subset. This allows compensation also for a phase offset that otherwise always occurs because windings in an arrangement over only one circuit segment have differently strong couplings to windings of adjacent coil pairs, and/or allows compensation for an offset that occurs with an asymmetrical coil arrangement. In more advantageous embodiments herein, improved temperature stability may further be achieved by a combination of a capacitor and a resistor.

In a third embodiment of this aspect, the at least one primary winding and the secondary winding circuit may be integrated together in a printed circuit board. This provides a very compact design for the detection device. In some particular illustrative embodiments herein, a number of primary windings and a number of secondary windings may be the same, and a primary winding may be assigned to or aligned with exactly one secondary winding at a time in the printed circuit board (i.e., a pair of coils is formed). In this case, a 1:1 assignment between primary windings and secondary windings is provided, whereby coupling between a primary winding and an associated secondary winding is improved. Furthermore, a sensitivity to electromagnetic interference fields is reduced here, since the use of more than one primary winding in the primary winding circuit means that an area in the lead plate occupied by a primary winding is smaller than when only one primary winding is provided. Also, primary windings of smaller size allow for space savings in the design of the primary winding circuit, since space now becomes available adjacent to and between individual primary windings. In addition to eliminating the need for a large area primary winding that provides a large trapping area for interference fields, a size of a primary winding may be matched to a size of the associated secondary winding, allowing coupling between primary windings and associated secondary windings to be improved and allowing interference of a secondary winding by a primary winding associated with an adjacent secondary winding to be reduced.

In an advantageous embodiment of this embodiment, the secondary windings may be sinusoidal coils. In this case, sinusoidal coils allow a sinusoidal measurement signal to be generated using a simple sensor structure in a detection system, for example, a strip-shaped sensor structure having a substantially constant width along the sensor structure over a circuit, but the strip having interruptions ensuring that a sinusoidal coil scanning the sensor structure has an overlap region (i.e., projected onto the strip). The strip may, for example, have a plurality of secondary coils, but the strip may have interruptions that cause a sinusoidal coil scanning the sensor structure to have an overlap region (i.e., projected area of the coil on the strip) between two interruptions, which results in a monotonically increasing or decreasing signal in the coil as the strip is scanned. For example, the plurality of secondary windings may be formed as two sinusoidal coils each with a center tap, whereby a sinusoidal coil with a center tap provides two secondary windings, which may be easily tapped by the center tap over a single secondary winding.

In a fourth embodiment of this aspect, the secondary winding circuit may further include a first resistor arranged in parallel with a first secondary winding from the first subset and a second resistor arranged in parallel with a first secondary winding from the second subset. The first resistor and the second resistor may be used to achieve offset matching. In detection devices, in which the secondary windings are not arranged uniformly over a full circle about an axis, an offset occurs in signals output by the secondary windings due to the necessarily asymmetrical arrangement of the secondary windings about the axis. Alternatively, instead of the first resistor a capacitor and/or instead of the second resistor a capacitor may be provided. Further, only one of the first resistor and the second resistor may be provided so that offset matching is achieved only in a subset, whereas a capacitor may be provided instead of this resistor so that offset matching is achieved by a capacitor only in a subset.

In an advantageous embodiment of this embodiment, the secondary winding circuit may further include a first capacitor and a second capacitor, wherein the first capacitor is arranged in parallel with a second secondary winding from the first subset and the second capacitor is arranged in parallel with a second secondary winding from the second subset. This may increase temperature stability in each subset in the case of a combination of the first resistor and the first capacitor in the first subset and a combination of the second resistor and the second capacitor in the second subset. Alternatively, only one of the first capacitor and the second capacitor may be provided, such that improved temperature stability is achieved in only one subset.

In a second aspect, a detection device for a position sensor is provided, such as a rotor position sensor or generally a position sensor that detects not a position of a rotor of an electric machine but a position of any rotating part, such as a part flanged to a rotor of an electric machine via a gearbox, for example, or a rotating part that rotates only in a limited angular range or continuously. In the illustrative embodiments of the first aspect, the detection device for a position sensor includes at least one primary winding and a secondary winding circuit including a plurality of secondary windings inductively coupled to the at least one primary winding, wherein the plurality of secondary windings includes a first subset of at least two secondary windings arranged in series with each other and a second subset of at least two secondary windings arranged in series with each other, and wherein the secondary winding circuit further includes a first resistor or capacitor arranged between a secondary winding of the first subset and a secondary winding of the second subset or arranged in parallel with a first secondary winding of the first subset or the second subset.

In some embodiments of this aspect, the at least one primary winding and the secondary winding circuit may be integrated together in a printed circuit board.

In some embodiments of this aspect, a number of primary windings and a number of secondary windings may be the same and a primary winding may be aligned with or assigned to exactly one secondary winding in the circuit board.

In some embodiments of this aspect, the secondary winding circuit may further include an add-on resistor or capacitor disposed between two other secondary windings each having one from the first subset and one from the second subset.

In some embodiments of this aspect, the plurality of secondary windings may be formed as two sinusoidal coils each having a center tap and only one primary winding may be provided, formed as a rectangular coil surrounding the secondary windings in plan view.

In some embodiments of this aspect, the secondary windings in each subset may be arranged in the secondary winding circuit in a wired manner relative to the one or more primary windings such that a differential signal is provided from each subset during operation of the detection device.

In some embodiments of this aspect, the secondary winding circuit may further include a first capacitor and a second capacitor, wherein the first capacitor is arranged in parallel with a second secondary winding from the first subset and the second capacitor is arranged in parallel with a second secondary winding from the second subset.

In a third aspect, a detection system is provided. In illustrative embodiments, the detection system includes a detection device according to one of the first and second aspects and a sensor element rotatably arranged relative to the detection device, the sensor element including a sensor structure formed of an electrically conductive material.

In the detection system of the third aspect, an angular position between the detection device and the sensor element is advantageously detected when the sensor element is moved relative to the detection device. For example, a relative rotational movement between the sensor element and the detection device due to a rotational movement of a rotor, which in specific applications may be a rotor of an electric machine, may generate a voltage induced in the secondary windings depending on an instantaneous position of the sensor element relative to the detection device. In other words, a magnetic field generated by the primary winding circuit is modulated by the sensor element and the modulated magnetic field induces in the secondary windings of the detection device a voltage signal representing a signal modulated by a sensor structure of the sensor element applied to the primary winding circuit, the sensor structure having a shape or form of the sensor structure along a revolution of the sensor element with respect to the detection device that varies depending on the angle.

In the detection device according to the first and/or second aspect, the primary and secondary windings may be provided as air coils, meaning that the primary and secondary windings are provided without a magnetizable core. In this case, external magnetic fields do not contribute to magnetization or even saturation, or only to a tolerable extent, due to the absence of a magnetic core material in the coil, so that the output signal obtained is relatively immune to interference, for example, from the large magnetic fields that occur in electrical machines. Thus, eddy current losses of the sensor structure, if at least partially composed of an electrically/magnetically conductive material, may be exploited to influence the output signals of the detection device, so that the detection device according to the first and second aspects is immune to interference with respect to electromagnetic influences. For example, air coils are wound and attached to a carrier, such as a suitable substrate or a printed circuit board or a flexible printed circuit board.

BRIEF DESCRIPTION OF DRAWINGS

Further advantages and illustrative embodiments of the above aspects of the disclosure are described below with reference to the accompanying figures, in which:

FIGS. 1a-1b schematically show a rotor position sensor according to some illustrative embodiments in planar views, the view in FIG. 1b being a sectional view along line 1b-1b in FIG. 1a;

DETAILED DESCRIPTION

Various illustrative embodiments described below may relate to an application of detection devices in rotor position sensors. In this regard, a rotor position sensor according to illustrative embodiments generally includes a detection system for detecting an angular position between a detection device of the detection system and a sensor element of the detection system. In this regard, the sensor element has a sensor structure formed of an electrically/magnetically conductive material that changes angularly upon full rotation (i.e., 360° rotation about an axis of rotation of the sensor element relative to the detection device), thereby detecting an angular position between the detection device and the sensor element.

A primary winding circuit in the detection device generates a magnetic field that is modulated by the sensor structure of the sensor element. A correspondingly modulated magnetic field in turn induces correspondingly modulated electrical signals in a plurality of secondary windings of the detection device. From a comparison between an electric signal applied to the primary winding circuit for generating the magnetic field and the electric signal output in response thereto by the secondary windings, an angular position between the sensor element and the detection device may be inferred.

Figure 1A:
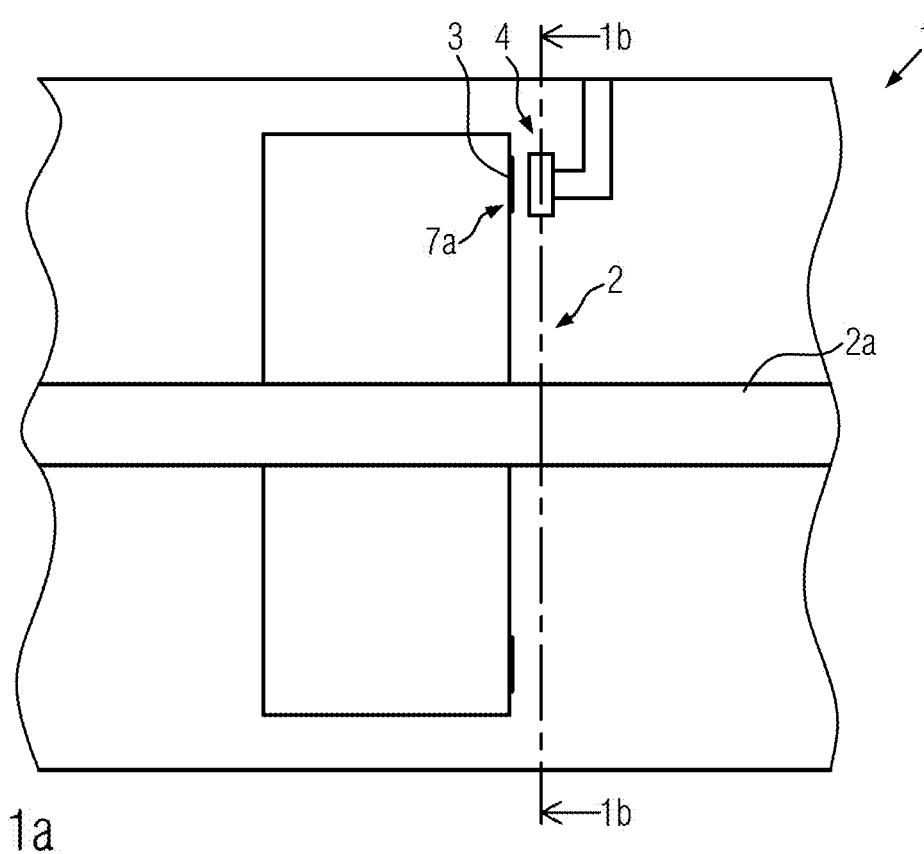
Figure 1B:
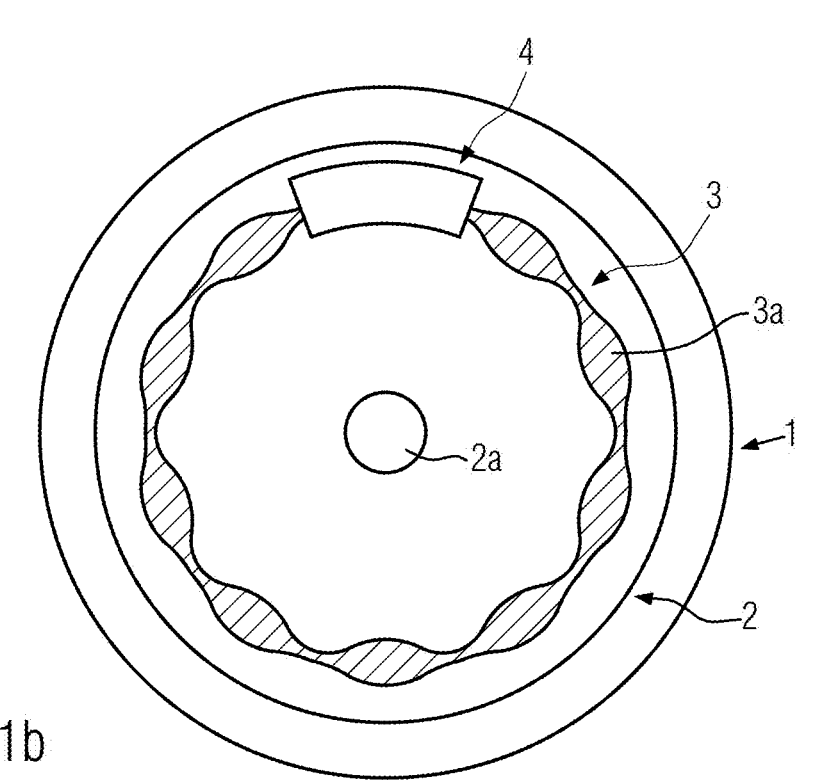
Figure 2:
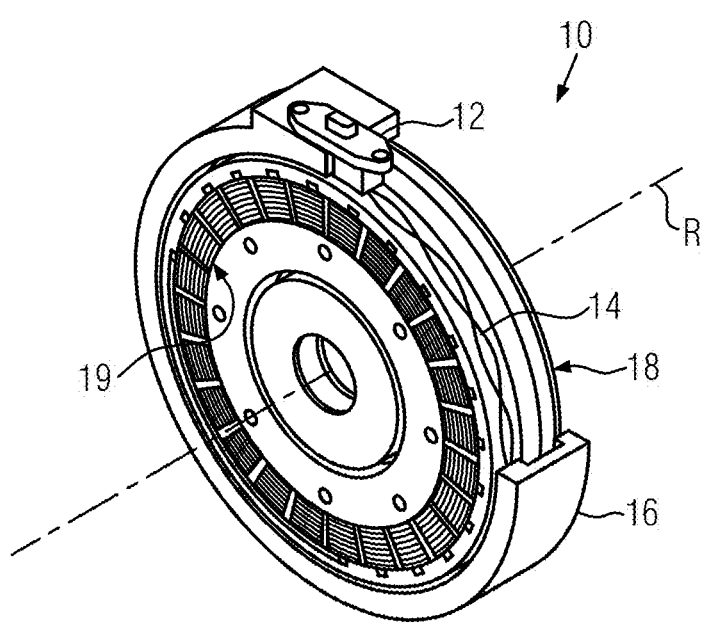
FIG. 2 schematically shows in a cutaway perspective view a rotor position sensor according to other illustrative embodiments.

With reference to FIGS. 1a, 1b and 2, two alternative embodiments for a rotor position sensor having a detection system for detecting an angular position between a detection device of the detection system and a sensor element of the detection system are now described.

FIG. 1a schematically shows in a side view a rotor position sensor 1 of an electric machine. Here, a sensor structure 3 is attached to an axial surface of a rotor, for example a rotor 2 of an electric machine, and is movable with the rotor. In illustrative examples, the electric machine may be a permanent-magnetically excited machine, in which an angular signal is used for electrical commutation. Furthermore, a detection device 4 is provided, which is arranged axially opposite the sensor structure 3. The sensor structure 3 and the detection device 4 form a detection system for the rotor position sensor 1, wherein the sensor structure 3 is rotatably arranged relative to the detection device 4.

According to illustrative embodiments, the sensor structure 3 is applied to a suitable carrier material 7a or is directly mounted in a base material of the rotor 2, which is seated on a shaft 2a. A base material of the rotor 2 is to be understood as a material that is required for the function of the rotor 2, such as a material for holding components of the electric machine, such as magnets and the like.

FIG. 1b shows a section along the line 1b-1b in FIG. 1a, wherein the sensor structure 3 in this embodiment has a single track 3a extending periodically over a complete mechanical revolution of the rotor 2 (i.e., a rotation of the rotor 2 about the shaft 2a by 360°). However, this is not a limitation of the present disclosure and the track 3a may instead be formed as a strip of substantially constant width (without the periodically varying width shown in FIG. 1b, wherein periodic interruptions are provided in the strip) or as a strip having a width that varies monotonically over a complete mechanical revolution of the rotor 2. According to some exemplary embodiments, the sensor structure 3 may have repeating triangular structures instead of the track 3a shown in FIG. 1b. However, other shapes that result in a position-dependent inductance change, such as rectangular structures, etc., may also be used. In some illustrative examples, the sensor structure 3 may include, for example, aluminium, steel, copper, a printed circuit board, one or more conductive layers, or a metallized plastic. In general, the sensor structure 3 may be merely electrically conductive, and in particular the sensor structure may be non-magnetic or magnetizable, and thus may include an electrically conductive component embedded in or attached to a support material of the rotor 2 that is not electrically conductive. However, this is not a limitation of the disclosure and the sensor structure may be formed of a magnetic or magnetizable material embedded in or attached to a support material of the rotor 2.

With reference to FIG. 2, a cutaway perspective view schematically shows a rotor position sensor 10 according to illustrative embodiments, in which the rotor position sensor 10 is attached to a motor and is configured as an alternative embodiment to the rotor position sensor 1 in FIGS. 1a and 1b. In this case, the rotor position sensor 10 has a detection system, which is formed from a detection device 12 and a sensor structure 14, the sensor structure 14 being arranged such that it is rotatable about a rotor axis R with respect to the detection device 12. The sensor structure 14 is here attached to a radial surface of a rotor, for example a rotor 18 of an electric machine, and is movable therewith. As shown in FIG. 2, the motor has a stator coil 19, with which a stator of the motor is wound. The sensor structure 14 may be formed in accordance with the sensor structure 3, and reference is made to the above description in this regard.

According to the embodiment of FIG. 2, the detection device is arranged radially opposite to the sensor structure 14 on the outside of a motor housing 16 of the motor, with the stator coil 19 resting relative to the rotor 18. In the illustration of FIG. 2, the motor housing 16 is partially cut open for display reasons to show the sensor structure 14 disposed below the detection device 12, which would otherwise be obscured by the motor housing 16 in the perspective view of FIG. 2.

According to some illustrative embodiments, the detection device 12 may include a plurality of windings (not shown) and an electronic circuit (not shown) that processes signals output from the windings and outputs them as position signals, such as electrical signals such as voltage amplitudes, differential voltages, current amplitudes, differential currents, frequencies, phase angles, etc., wherein the electrical signals enable an angular rotational position of the rotor 18 to be obtained relative to the detection device 12.

Figure 3:
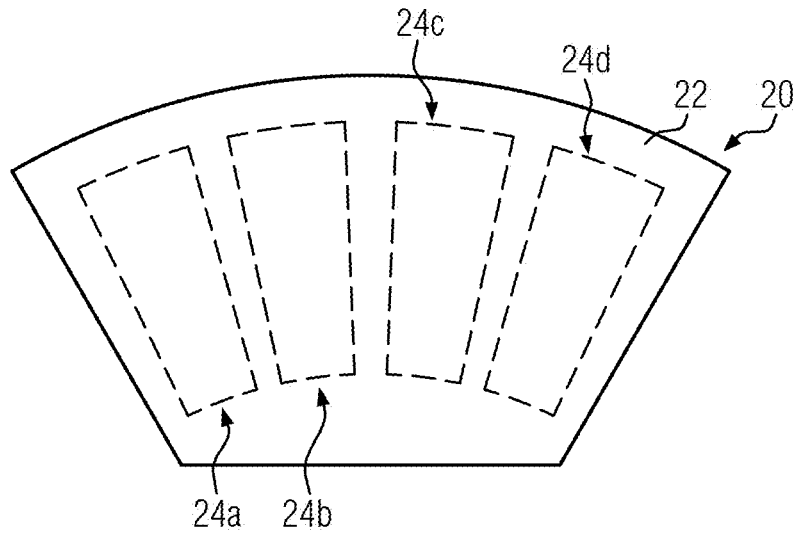
FIG. 3 schematically shows, in a planar view, a detection device according to some illustrative embodiments.

With reference to FIG. 3, some illustrative embodiments of a detection device 20 are explained in more detail below. The detection device 20 includes a circuit board 22 having a plurality of coils, such as a plurality of secondary windings 24a, 24b, 24c, and 24d, arranged side-by-side in the circuit board 22. Furthermore, at least one primary winding (not shown) may be formed in the circuit board 22. For example, a single primary winding (not shown) may be provided, and this primary winding (not shown) may surround the secondary windings 24a to 24d in the top view shown in FIG. 3. Alternatively, two primary windings (not shown) may be provided, wherein one of the primary windings (not shown) may surround the two adjacent secondary windings 24a and 24b in the top view shown, while the other of the primary windings (not shown) may surround the two adjacent secondary windings 24c and 24d in the top view shown. In another alternative, four primary windings (not shown) may be provided, each of these primary windings (not shown) may substantially congruently overlie a respective one of the secondary windings 24a to 24d.

The secondary windings 24a to 24d may be rectangular coils (as shown in dashed lines in FIG. 3). The term rectangular is understood to represent a shape arising from a rectangle by deforming (stretching or compressing at least one side of the rectangle) the rectangle (such as a trapezoid) or being a rectangle. In this context, a compression of a line to a point shall also be understood as falling under the term "deforming", so that a rectangle may also be deformed into a triangle.

According to some illustrative embodiments, the printed circuit board 22 may be used in the rotor position sensor of FIGS. 1a and 1b such that the printed circuit board 22 is to be identified by reference numeral 4 in the context of FIG. 1b. In this case, the term rectangular is also to be understood to indicate a shape that may be formed from a rectangle by deforming (as described above), and further, at least one radial side of a deformed rectangle in an axial arrangement according to FIG. 1b may have a curvature that substantially corresponds to a curvature on a radial line around the shaft 2a in FIG. 1b in the circuit board 22 (cf. reference numeral 4 in FIG. 1b in this regard). In other words, a correspondingly curved radial side may correspond to an arcuate portion around the shaft 2a in FIG. 1b at the location of the radial side with respect to the shaft 2a.

According to other illustrative embodiments, the printed circuit board 22 may be inserted in the rotor position sensor of FIG. 2 such that the printed circuit board 22 would be identifiable in the context of FIG. 2 by a lower surface of the detection device 12 in FIG. 2 facing the sensor structure 14 in FIG. 2. This lower surface of the detection device 12 in FIG. 2 may be planar or may be formed in accordance with an arcuate portion around the rotor axis R in FIG. 2 at the location of the lower surface of the detection device 12 in FIG. 2. In this case, the term rectangular is also to be understood to indicate a shape that may be formed from a rectangle by deforming (as described above), and further, at least one radial side of a deformed rectangle in a radial arrangement according to FIG. 2 may have a curvature substantially corresponding to a curvature on a radial line around the rotor axis R in FIG. 2 in the circuit board 22 (cf. lower surface of capture device 12 in FIG. 2 in this regard). Further, in an application as an element of the detection device 12 in FIG. 2, with reference to FIG. 2, the printed circuit board 22 may be oriented in the detection device 12 of FIG. 2 such that a surface normal of the printed circuit board is oriented parallel to a radial direction with respect to a rotation about the rotor axis R in FIG. 2.

With reference to FIG. 3, an embodiment is shown, in which the secondary windings 24a to 24d are integrated into a material of the printed circuit board 22, as illustrated by the dashed representation of the secondary windings 24a to 24d. This provides improved integrity of the secondary windings 24a to 24d even in challenging environmental conditions. To this end, the secondary windings 24a to 24d may be overmolded or potted with a suitable material, with or without a carrier material, or they may be installed in a housing or provided with only a printed circuit board. When the secondary windings are overmolded or potted, each of the secondary windings 24a to 24d does not necessarily need to be fully embedded in the material of the printed circuit board 22, but a top conductor surface of each of the secondary windings 24a to 24d may be left exposed or the coverage of the secondary windings 24a to 24d may be small so that, together with a thickness of the material of the printed circuit board 22, a desired gap to a sensor structure (not shown) is obtained. Alternatively, the secondary windings may be mounted on the circuit board 22 and connected to electrical leads (not shown) in the circuit board 22 via external connections (not shown) of the circuit board 22.

With reference to FIGS. 1 to 3, it is noted that due to a smaller dimension of the illustrated detection devices compared to a circumferential length of the illustrated sensor structures, the secondary windings and correspondingly the primary winding(s) not shown are arranged over only a circular arc segment of the stator.

Figure 4:
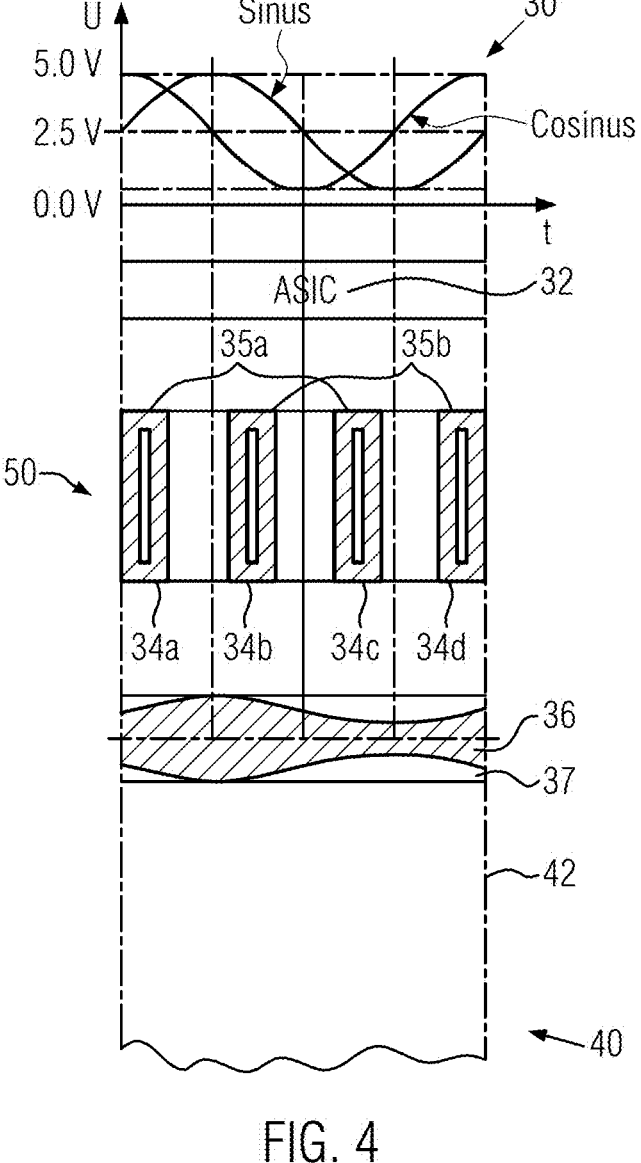
FIG. 4 schematically shows an arrangement of secondary windings with respect to a sensor structure and the resulting output signals of the detection device according to some illustrative embodiments.

With reference to FIG. 4, a description is given regarding a relationship between the sensor structure and secondary windings according to some illustrative embodiments and the electrical signals output from the secondary windings.

FIG. 4 schematically shows an arrangement of a sensor structure 36 of a sensor element 37 in relation to a plurality of secondary windings 50. The plurality of secondary windings 50 is formed by four secondary windings 34a, 34b, 34c and 34d, which are formed as rectangular windings according to the illustration and arranged side by side with respect to the sensor structure 36. The sensor structure 36 here represents a structure as described above with reference to the preceding figures, so that no further repetition of the above description is made here. In particular, the sensor structure 36 represents a structure formed of an electrically conductive material, which is formed along a revolution of a rotor (not shown) in a single or multiple periodic manner, for example at least one period of the sensor structure 36 represents one full revolution of the rotor (not shown).

With reference to FIG. 4, the secondary windings 34a to 34d are arranged side by side with respect to the sensor structure 36 such that the secondary windings 34a to 34d are arranged substantially equidistant from each other along a period of the sensor structure 36. Thus, the secondary windings 34a to 34d may each be associated with a section of the sensor structure 36, so that the sensor structure 36 is divided into four sections of substantially equal size along the period of the sensor structure 36. In other words, the secondary windings are offset from each other with respect to the period of the sensor structure by one quarter of the period of the sensor structure 36. Thus, the secondary winding 34a has a relation to the secondary winding 34b of one quarter of the period of the sensor structure 36, the secondary winding 34a has a relation to the secondary winding 34c of one half of the period of the sensor structure 36, and the secondary winding 34a has a relation to the secondary winding 34d of three quarters of the period of the sensor structure 36.

With reference to the schematic diagram of FIG. 4, there is further shown a signal processing circuit 32 connected to the secondary windings 34a to 34d, which receives electrical signals output by the secondary windings 34a to 34d, processes them, and outputs them as processed signals 30. In some illustrative examples, the signal processing circuit may affect filtering and/or offset balancing and/or phase balancing, as will be discussed in more detail below. In this regard, the secondary windings 34a and 34c are interconnected in a subset 35a and output electrical signals to the signal processing circuit 32. Further, the secondary windings 34b and 34c are interconnected with each other in a subset 35b and output electrical signals to the signal processing circuit 32.

The processed signals 30 shown in FIG. 4 are exemplified over a time interval that corresponds exactly to a period of the sensor structure 36. In other words, the time interval shown represents an interval, in which the plurality of secondary windings 50 sweep or scan an entire period of the sensor structure 36. Here, with reference to the sensor structure 36, the signals output from the subset 35a are represented as "sine" in the processed signals 30, while the signals output from the subset 35b are represented as "cosine" in the processed signals 30. These sine and cosine signals allow unambiguous identification of an angular position and direction of rotation of the secondary windings 34a to 34d with respect to the sensor structure 36, and thus of a detection device including the secondary windings with respect to the sensor structure 36.

Figure 5:
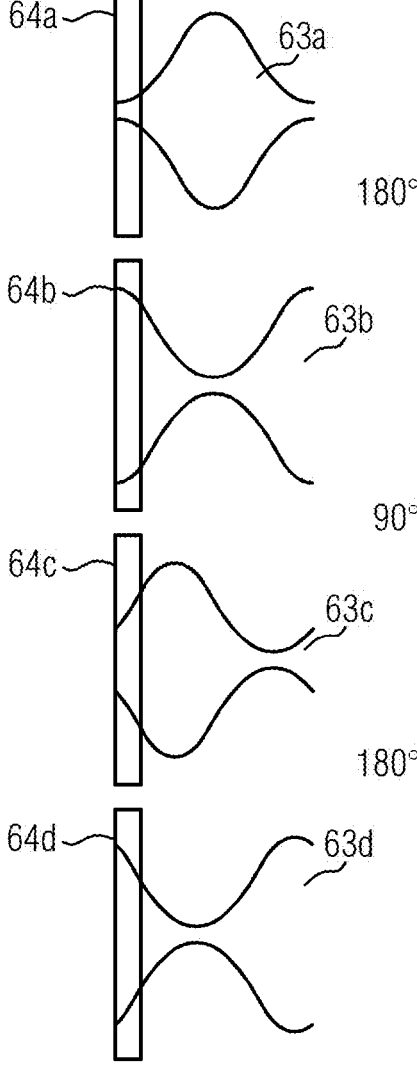
FIG. 5 schematically shows arrangements of individual secondary windings with respect to a sensor structure according to some illustrative embodiments.

With reference to FIG. 5, individual secondary windings 64a to 64d are shown with respect to different sections 63a to 63d of a sensor structure at the same time. Here, it is evident that there is an angular position of 180° with respect to a period of the sensor structure between the sections 63a and 63b scanned by the secondary windings 64a and 64b. Similarly, between the sections 63c and 63d scanned by the secondary windings 64c and 64d, there is an angular position of 180° with respect to one period of the sensor structure. On the other hand, between the sections 63a and 63c scanned by the secondary windings 64a and 64c there is an angular position of 90° with respect to one period of the sensor structure, while between the sections 63tec and 63d scanned by the secondary windings 64b and 64d there is an angular position of 90° with respect to one period of the sensor structure.

With reference to FIG. 4, the secondary windings 64a to 64d in FIG. 5 may be identified with the secondary windings 34a to 34d, in which case the sections 63a to 63d represent sections of the sensor structure 36 that are scanned by the corresponding secondary windings 34a to 34d at the same period.

In the embodiments described with reference to FIGS. 1 to 5, the sensor structure may be formed in a sinusoidal shape on or at a sensor element. In this case, the sinusoidal shape is advantageous because this geometry enables the sensor structure to form an attenuation surface in the form of a sinusoidal track, which in turn enables an electrical signal detected by a detection device to be influenced in a sinusoidal manner and thus to be easily evaluated. However, this is not a limitation and in principle other sensor structures may be used, as noted above. In general, sensor structures are not necessarily multiple-periodic at a full revolution, as long as it is possible to unambiguously assign electrical signals detected by a detection device sensing the sensor structure to a position or angular position of the detection device with respect to the sensor structure along a full revolution.

In accordance with the above description of various embodiments, in a detection system according to some illustrative embodiments, output signals modulated by a sensor element are provided by various subsets of secondary windings (cf., for example, subsets 35a and 35b in FIG. 4), in which the amplitude and/or phase and/or frequency of an output signal corresponding to a sensor structure of the sensor element are changed in the course of a rotational movement of the sensor element relative to the detection device. Subsets of secondary windings may be defined with respect to the sensor structure, in which the electrical signals output from two subsets have a phase offset of 90° degrees with respect to each other regarding a period of the sensor structure. This allows the provision of output signals of the subsets that have a sinusoidal and cosinusoidal relationship to each other and are therefore easy to evaluate with known methods. Within a subset, the secondary windings may be arranged with respect to each other in such a way that they provide electrical signals with a phase offset of either 180° with respect to one period of the sensor structure or a phase offset of 360° with respect to one period of the sensor structure. In the case of a phase offset of 180°, the signals output by the secondary windings in a subset may be provided as differential output signals of the subset so that equal noise signals generated by each secondary winding in a subset are compensated.

Figure 6:
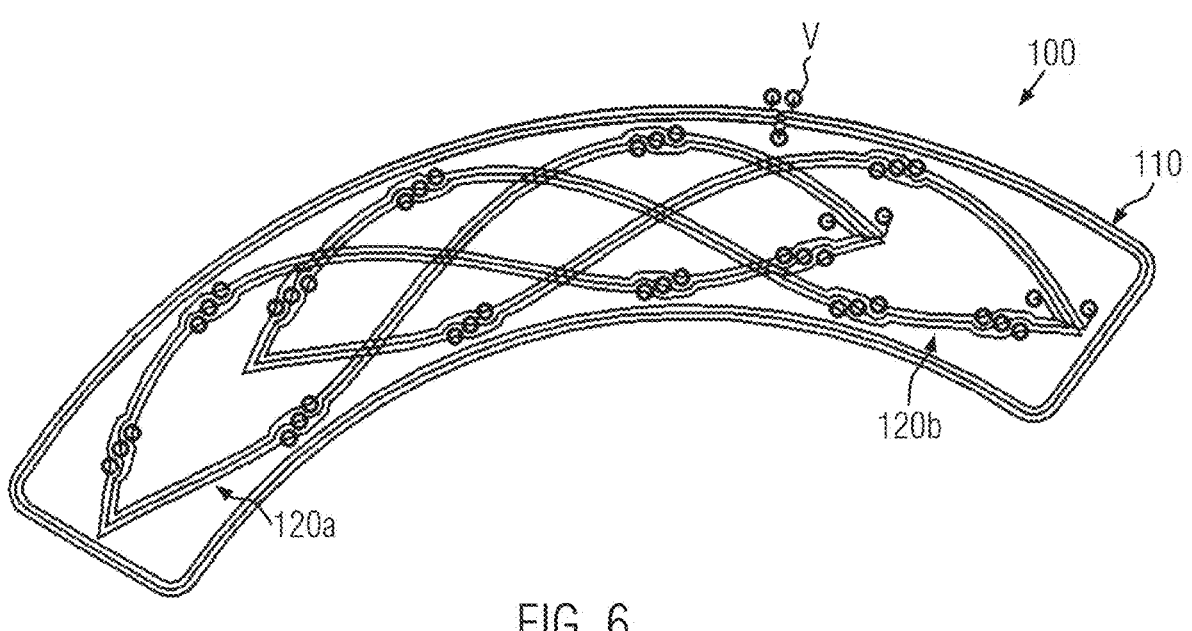
FIG. 6 schematically shows, in a top view, a primary winding and a plurality of secondary windings according to some illustrative embodiments.
Figure 7:
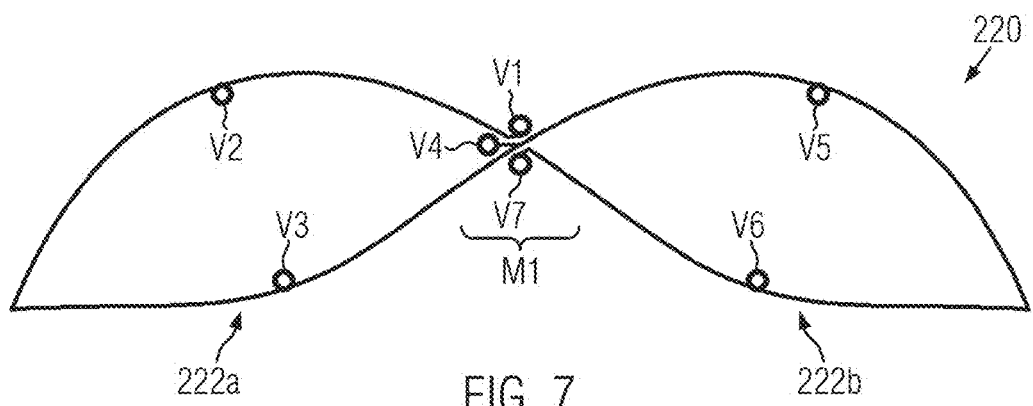
FIG. 7 schematically shows, in a top view, secondary windings with center taps according to some illustrative embodiments.
Figure 8:
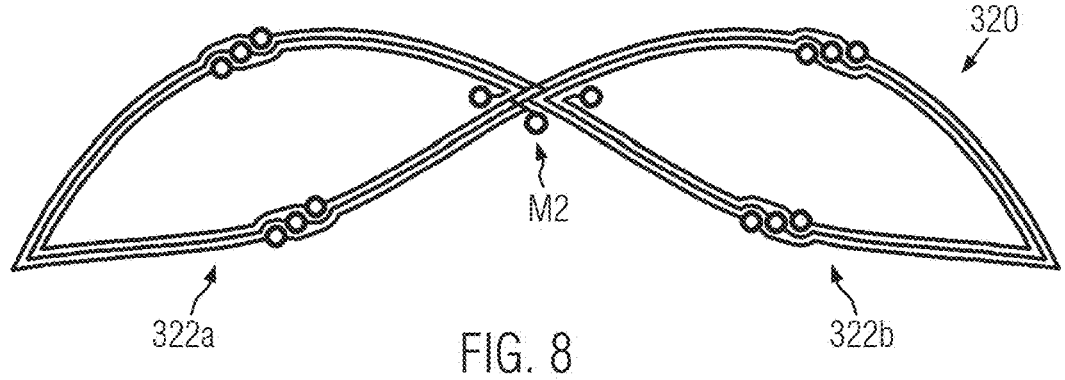
FIG. 8 schematically shows, in a top view, secondary windings with multiple turns and center taps according to some illustrative embodiments FIG. 9 schematically showing a circuit diagram of a detection system according to some illustrative embodiments.

With reference to FIGS. 6 to 8, illustrative embodiments are described, in which the secondary windings are sinusoidal coils. In the case of sinusoidal secondary windings, it is not necessary for a sensor structure of a sensor element to have a varying structure along a complete revolution. If a periodically varying sensor structure is scanned by a sinusoidal secondary winding, this results in an electrical output signal that is a modified sinusoidal signal corresponding to the periodically varying sensor structure. For example, a sinusoidal sensor structure scanned by a sinusoidal secondary winding results in an electrical signal proportional to $\sin^2$.

With reference to FIG. 6, a detection device 100 is schematically illustrated. The detection device 100 includes a primary winding 110 and a plurality of secondary windings provided by the sinusoidal coil 120a and by the sinusoidal coil 120b. The primary winding represents a rectangular coil surrounding the plurality of secondary windings in the top view shown. A printed circuit board of the detection device 100 is not shown.

Each of the sinusoidal coils 120a and 120b is formed from two sinusoidal coil sections that are 180° out of phase with each other with respect to their sinusoidal shape. Thus, illustratively, each of the sinusoidal coils 120a and 120b is similar in shape to oo. In specific illustrative examples, the sinusoidal coil 120a and the sinusoidal coil 120b may be substantially congruent in shape, but offset by 90° with respect to their sinusoidal shape. This represents an advantageous, but not limiting, example, in which corresponding coils may be readily mass produced and output of sinusoidal signals is ensured.

Since the sinusoidal coils 120a and 120b overlap individually and with each other a plurality of times, the sinusoidal coils 120a and 120b are formed as preferably multilayer coils, in which vertical contacts V between the individual layers provide an electrical connection. With respect to the secondary windings and the primary winding 110, the vertical contacts also serve as external contacts. This is not a restriction, however, and only an overpass and/or underpass such as a bridge contact may be provided at a point where crossing would occur, in which case the secondary windings would run in the same plane of a printed circuit board except for the bridge contacts.

With reference to FIG. 7, an alternative embodiment to FIG. 6 is shown. More specifically, a sinusoidal coil 220 is shown with two secondary windings 222a and 222b each having one turn, the secondary windings 222a and 222b being arranged in series and having opposite turns to each other. Vertical contacts V1 and V7 represent external contacts to the sinusoidal coil 220, such that vertical contact V1 represents an external contact of secondary winding 222a, while vertical contact V7 represents an external contact of secondary winding 222b. Further vertical contacts V2, V3, V4, V5 and V6 are used for vertical connection between different horizontal layers (not shown) of a printed circuit board (not shown), in which individual winding sections of the sinusoidal coil 220 extend. For example, sections extending between vertical contacts V1 and V2, V3 and V1, and V5 and V6 are in a first layer or plane, while sections extending between vertical contacts V2 and V3, V4 and V5, and V6 and V7 are in a second layer different from the first layer. A center tap M1 is implemented by the vertical contacts V4 so that a voltage signal may be tapped across the secondary winding 222a between V1 and M1 and a voltage signal may be tapped across the secondary winding 222b between M1 and V7.

By means of the center tap M1, it is possible to connect each of the secondary windings 222a and 222b to an electrical component to allow correction of the signal output by the sinusoidal coil 220.

With reference to FIG. 8, an alternative embodiment to FIG. 7 is shown. More specifically, a sinusoidal coil 320 is shown with two secondary windings 322a and 322b each having a plurality of turns, the secondary windings 322a and 322b being arranged in series and having opposite sense of turns with respect to each other. Vertical contacts represent external contacts to the sinusoidal coil 320 and internal connections between different layers, in which individual winding sections of the sinusoidal coil 320 are routed, in analogy to the above description of FIG. 7. Furthermore, a center tap M2 is implemented so that a voltage signal across the secondary winding 322a and a voltage signal across the secondary winding 322b may be tapped by M2.

Figure 9:
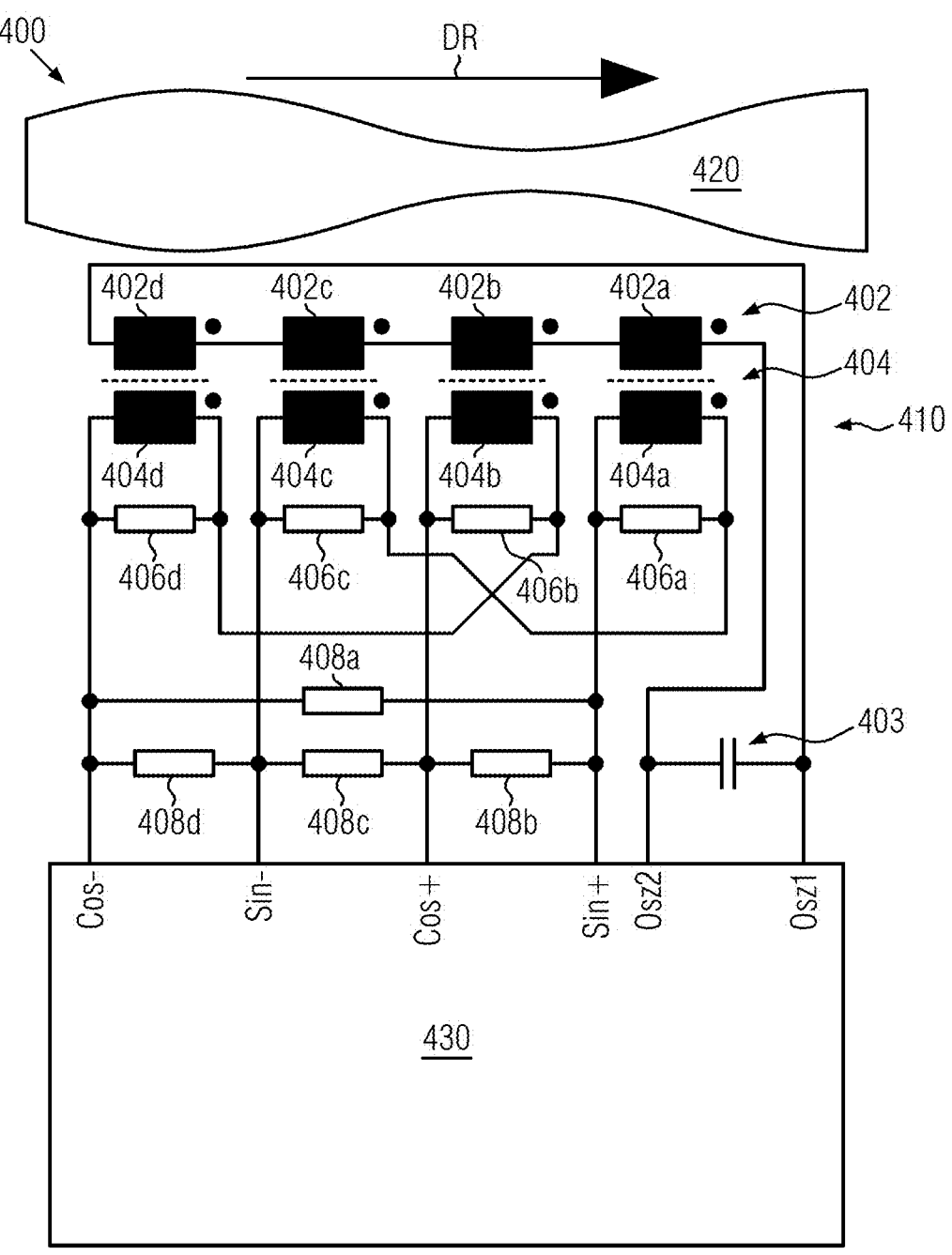

With reference to FIG. 9, a detection system 400 including a detection device 410 and a sensor element is illustrated with reference to a sensor structure 420 of the sensor element in FIG. 9. While the sensor structure 420 is shown as a sinusoidally varying structure, this is not a limitation and alternative sensor structures may be used, as variously noted above. A direction of rotation, in which the sensor element moves relative to the detection device 410, is shown schematically in FIG. 9 using an arrow DR for illustration.

According to the embodiment in FIG. 9, the detection device 410 includes a plurality of primary windings 402 and a plurality of secondary windings 404. These windings may be integrated into a printed circuit board (not shown), as described above with reference to various illustrative embodiments. The plurality of primary windings 402 has four primary windings 402a to 402b, and the plurality of secondary windings 404 has four secondary windings 404a to 404b. The number of secondary windings is not limited to four, and a multiple of four secondary windings may be provided. With respect to the number of primary windings, instead of four primary windings, the number of primary windings may be provided such that it matches the number of secondary windings as 1:1. Alternatively, a subset of secondary windings from the plurality of secondary windings may be associated with exactly one primary winding. For example, one primary winding from each of a plurality of primary windings may be associated with two or more secondary windings, such that each primary winding is associated with a subset of secondary windings, each subset having an equal number of secondary windings.

With reference to FIG. 9, an electronic circuit 430 is provided that both applies an electrical signal to the plurality of primary windings 402 and receives electrical signals output by the plurality of secondary windings 404. For example, the electronic circuit may include an oscillator circuit (only oscillator terminals Osz1 and Osz2 are shown in FIG. 9), by which a periodic electrical signal is applied to the plurality of primary windings 402.

The plurality of primary windings 402 may be connected in a resonator circuit 403 that is powered by the oscillator circuit of the electronic circuit 430. For example, the plurality of primary windings 402 may be formed by a series connection of the primary windings 402a to 402d. However, this is not a limitation and a suitable parallel connection of at least some of the primary windings 402a to 402d may be provided.

The secondary windings 404a to 404d of the plurality of secondary windings 404 may be divided into subsets of two secondary windings each arranged in series, which are separately connected to the electronic circuit 430. For example, the secondary windings 404a and 404c may be arranged in series with each other and form one subset of secondary windings, while the secondary windings 404b and 404d may be arranged in series with each other and form another subset of secondary windings. Each of these subsets provides electrical signals to the electronic circuit 430, based on which an angular position determination may be made in the detection system 400. The secondary windings in each subset are wound and interconnected relative to each other such that a voltage signal output by a subset is a differential signal. This means that a voltage signal output by a subset corresponds to a difference of voltages induced in the individual windings of the subset. Various embodiments, in which each subset is configured to output a differential signal, are described in more detail with reference to FIGS. 9, 11 and 12 below.

With respect to the embodiments described with reference to FIG. 9, this means that all of the primary windings 402a to 402d and all of the secondary windings 404a to 404d have the same winding sense relative to each other, but the secondary windings 404a and 404c are interconnected in a subset such that a differential signal may be tapped from this subset. Likewise, the secondary windings 404b and 404d are interconnected in another subset in such a way that a differential signal may be tapped from this subset. Thus, a differential signal may be provided by the secondary windings 404a and 404c in the electronic circuit 430 through the terminals "sin+" and "sin–", while a differential signal is also provided by the secondary windings 404b and 404d in the electronic circuit 430 through the terminals "cos+" and "cos–". With reference to each other, the electrical signals of the subset of secondary windings 404a and 404c, on the one hand, and the subset of secondary windings 404b and 404d, on the other hand, are periodic signals that are 90° out of phase with each other, as may be understood from the above discussion of illustrative embodiments.

With respect to other embodiments of the sensor structure 420 that are different from the illustrated sensor structure 420 (as described above with respect to various embodiments of sensor structures), a suitable shape may be selected for the secondary windings and primary windings, for example in the form of sinusoidal coils or rectangular coils.

In some illustrative embodiments, the plurality of primary windings 402 is arranged with respect to the plurality of secondary windings 404 such that each respective one of the primary windings 402a to 402d and each respective one of the secondary windings 404a to 404d are arranged in a coil pair such that these windings in the coil pair have maximum inductive coupling compared to inductive coupling between a winding from that coil pair and a winding from a different coil pair. For example, this specifically means that the primary winding 402a and the primary winding 404a form a coil pair (402a, 404a) that is specified such that an inductive coupling between the primary winding 402a and the secondary winding 404a is maximal compared to an inductive coupling between the primary winding 402a and any one of the secondary windings 404b to 404d and also compared to an inductive coupling between the secondary winding 404a and any one of the primary windings 402b to 402d. Accordingly, the remaining windings 402b to 402d and 404b to 404d may also be arranged in pairs of coils. This may be realized according to a particular illustrative (but not limiting) example in an arrangement of the windings, in which one primary winding and one secondary winding each are directly opposite each other or are interleaved with each other. In this way, maximum signal strengths are generated by each coil pair, so that little to no amplification is required for signals generated by coil pairs. In further illustrative examples, the primary and secondary windings in a coil pair may be congruent.

As shown in FIG. 9, the secondary windings 404a to 404d are connected in a secondary circuit, with two secondary windings each connected together in a subset. With respect to the illustration in FIG. 9, the secondary winding 404a and the secondary winding 404c are interconnected with each other in a subset of the plurality of secondary windings 404 and connected to the electronic circuit 430. For example, the secondary windings 404a and 404c are arranged in series between a two-pole terminal sin+/sin– of the electronic circuit 430. In this regard, the secondary windings 404a and 404c may be arranged in series such that the secondary windings 404a and 404c have an opposite sense of winding relative to each other in the series connection. As a result, differential signals are output from this subset to the electronic circuit 430. Further, the secondary windings 404b and the secondary windings 404d form a subset of the plurality of secondary windings 404 and are connected to the electronic circuit 430. For example, the secondary windings 404b and 404d are arranged in series between a two-pole terminal cos+/cos– of the electronic circuit 430. In this regard, the secondary windings 404b and 404d may be arranged in series such that the secondary windings 404b and 404d have an opposite sense of winding relative to each other in the series connection. As a result, differential signals are output from this subset to the electronic circuit 430. Subsets in this example represent an interconnection of secondary windings that are directly connected without an intervening element.

According to the embodiment in FIG. 9, at least one resistor and/or capacitor are further provided in the detection system 400 to achieve balancing of offsets and phases. As explained above, in rotor position sensors with detection devices, in which secondary windings are not arranged uniformly over a full circle around an axis, an offset occurs in signals output by the secondary windings due to the necessarily asymmetrical arrangement of the secondary windings around the axis. In the present case, for the detection system 400, if the secondary windings 404a to 404d are arranged asymmetrically about an axis of rotation (not shown), it may be assumed that an offset will occur in the signals. Furthermore, when the secondary windings 404a to 404d are arranged asymmetrically, phase deviations of 90° and 180° in phase positions occur between the secondary windings and subsets because the secondary windings have different degrees of coupling to adjacent windings. For example, secondary windings 404a and 404d each have only one adjacent secondary winding, while each of secondary windings 404b and 404c have two adjacent secondary windings.

In illustrative embodiments, offset balancing in the secondary winding circuit may be achieved by a resistor 406a to 406d arranged in parallel with a corresponding secondary winding. For example, only one resistor may be provided in each subset. Also, only one resistor may be provided in total. Alternatively, more resistors may be provided, for example, each of resistors 406a to 406d may be provided.

In illustrative embodiments, phase balancing in the secondary winding circuit may be achieved by means of a resistor 408a to 408d, each of which establishes an electrical connection between an input/output of one subset and an input/output of the other subset. One of the resistors 408a to 408d may be sufficient for this purpose. If required, one of the resistors 408a to 408d may be combined with another resistor therefrom.

Instead of at least one of the resistors 406a to 406d and/or at least one of the resistors 408a to 408d, a capacitor may be provided. A combination of a resistor and a capacitor may contribute to improved temperature stability. For example, one of the resistors 406a and 406c in the subset of secondary windings 404a and 404c may be replaced by a capacitor arranged in parallel with the corresponding secondary winding in that subset. Additionally or alternatively, one of the resistors 406b and 406d in the subset of secondary windings 404b and 404d may be replaced by a capacitor arranged in parallel with the corresponding secondary winding in that subset. Additionally or alternatively, a resistor may be provided from resistors 408a to 408d, and a capacitor may be provided in place of one of the remaining resistors from 408a to 408d.

Specific values for resistors and capacitors in the secondary winding circuit are predominantly dependent on the layout of the detection device 410 or detection system 400. Various measurements and/or simulations may be performed at the beginning of a development to determine phase offset and offset. From this, suitable resistors and/or capacitors (including for temperature stability) may then be determined so that suitable offset matching and/or phase matching, with improved temperature stability if necessary, may be achieved by using appropriate resistors and/or capacitors in the secondary winding circuit.

Figure 11:
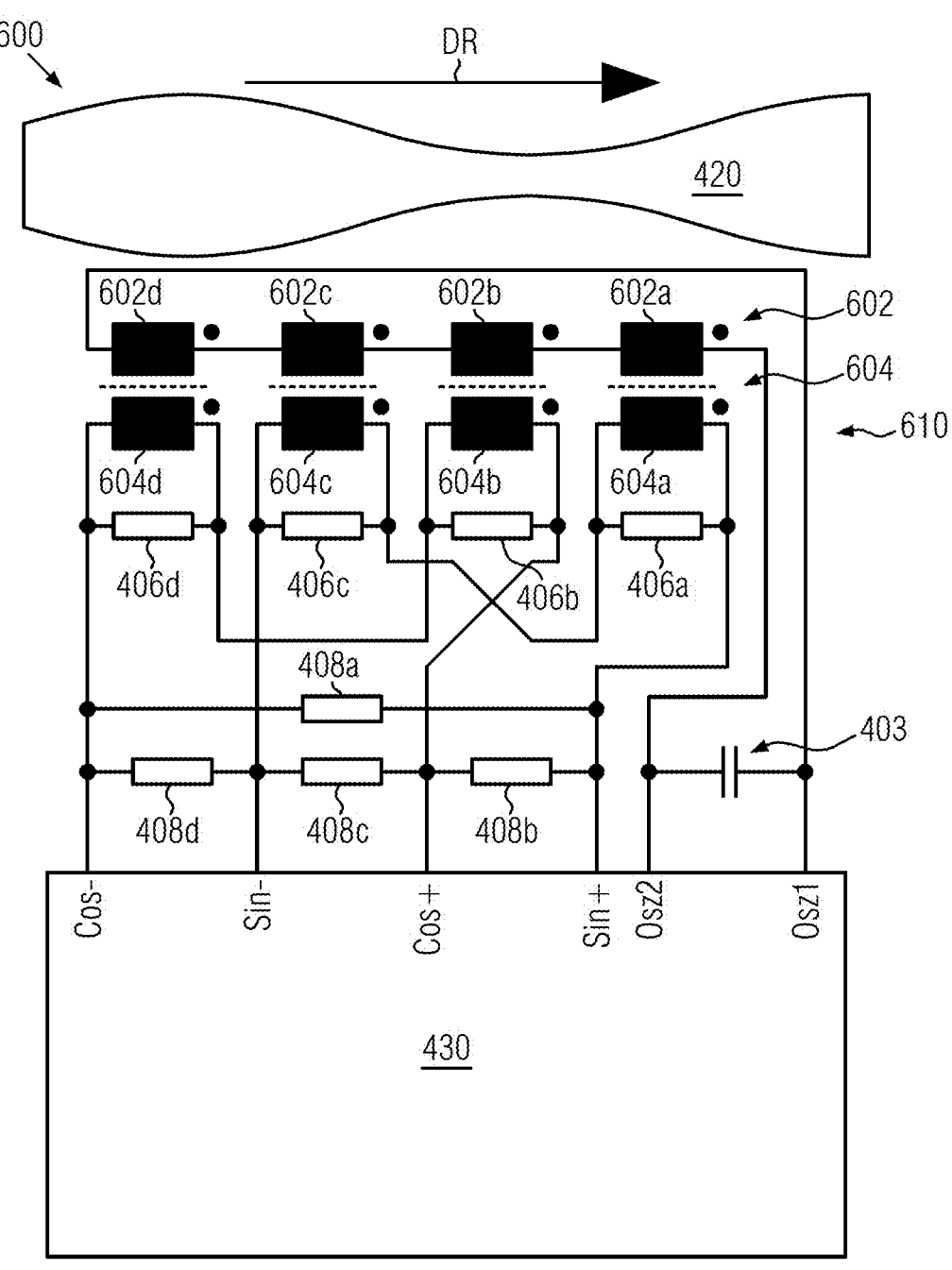
FIG. 11 schematically shows a circuit diagram of a detection system according to some other illustrative embodiments.

With regard to FIG. 11, alternative embodiments to FIG. 9 are now described, in which subsets of secondary windings are formed to provide a differential signal. Here, identical reference signs between FIGS. 9 and 11 denote identical features, and reference is made to the description above for FIG. 9 for a description of these identical features.

FIG. 11 shows a detection system 600 that differs from the detection system 400 in FIG. 9 in that it includes a detection device 610. More specifically, the detection device 610 differs from the detection device 410 in FIG. 9 by having a plurality of primary windings 602 and a plurality of secondary windings 604, as will now be described in more detail below.

The plurality of primary windings 602 includes primary windings 602a, 602b, 602c, and 602d arranged in series, the primary windings 602a and 602b being wound in the same direction and arranged in series with each other such that in both windings a current, applied to an input terminal of the primary winding 602a, flows in the same direction. Further, the primary windings 602c and 602d are arranged in series wound in the same sense with respect to each other and are arranged in series wound in opposite senses relative to the primary windings 602a and 602b so that a current applied to the primary winding 602a flows in the primary windings 602c and 602d in opposite direction relative to the primary windings 602a and 602b. However, a current applied to an input terminal of the primary winding 602c flows through the two primary windings 602c and 602d in the same direction.

The plurality of secondary windings 604 includes secondary windings 604a, 604b, 604c, and 604d arranged in an arrangement of same winding sense with respect to each other, such that the secondary windings 604a and 604b are wound in the same direction relative to the primary windings 602a and 602b, while the secondary windings 604c and 604d are wound in opposite directions relative to the primary windings 602c and 604d. An interconnection of the secondary windings 604a and 604c in the detection device 610 with the electronic circuit 430 is such that a magnetic flux density (not shown) generated by the primary winding 602a during operation of the detection device generates a current in the associated secondary winding 604a, which is applied by the secondary winding 604a to the secondary winding 604c and flows therethrough in the same sense relative to the current flow in the secondary winding 604a. However, since in the coil pair including the primary winding 602c and the secondary winding 604c the windings have an opposite winding sense to each other, an oppositely flowing current is induced here, so that in operation of the detection device 610 a differential signal results between the input terminal and the output terminal of a subset formed by the secondary windings 604a and 604c. Accordingly, when the secondary windings 604b and 604d in a subset of the detection device 610 are connected to the electronic circuit 430, a magnetic flux density (not shown) generated by the primary winding 602b during operation of the detection device generates a current in the associated secondary winding 604b, which is applied from the secondary winding 604b to the secondary winding 604d and flows therethrough in the same direction relative to the current flow in the secondary winding 604b. However, since in the coil pair consisting of the primary winding 602d and the secondary winding 604d, the windings have opposite winding senses to each other, an oppositely flowing current is induced here by the primary winding 602d in the secondary winding 604d during operation of the detection device610, resulting in a differential signal between input and output terminals from this subset of secondary windings 604b and 604d.

With reference to FIG. 11, coil pairs of primary winding with associated secondary winding are given by (602a, 604a) and (602b, 604b) and (602c, 604c) and (602d, 604d). Only in the coil pairs (602a, 604a) and (602b, 604b) are windings of the same sense present, while the windings in the coil pairs (602c, 604c) and (602d, 604d) are oppositely wound to each other. Further, the plurality of secondary windings 604 are divided into two subsets [604a, 604c] and [604b, 604d], with the windings in one subset being arranged in series with each other, with current, applied to the subset, flowing in the same direction.

Figure 12:
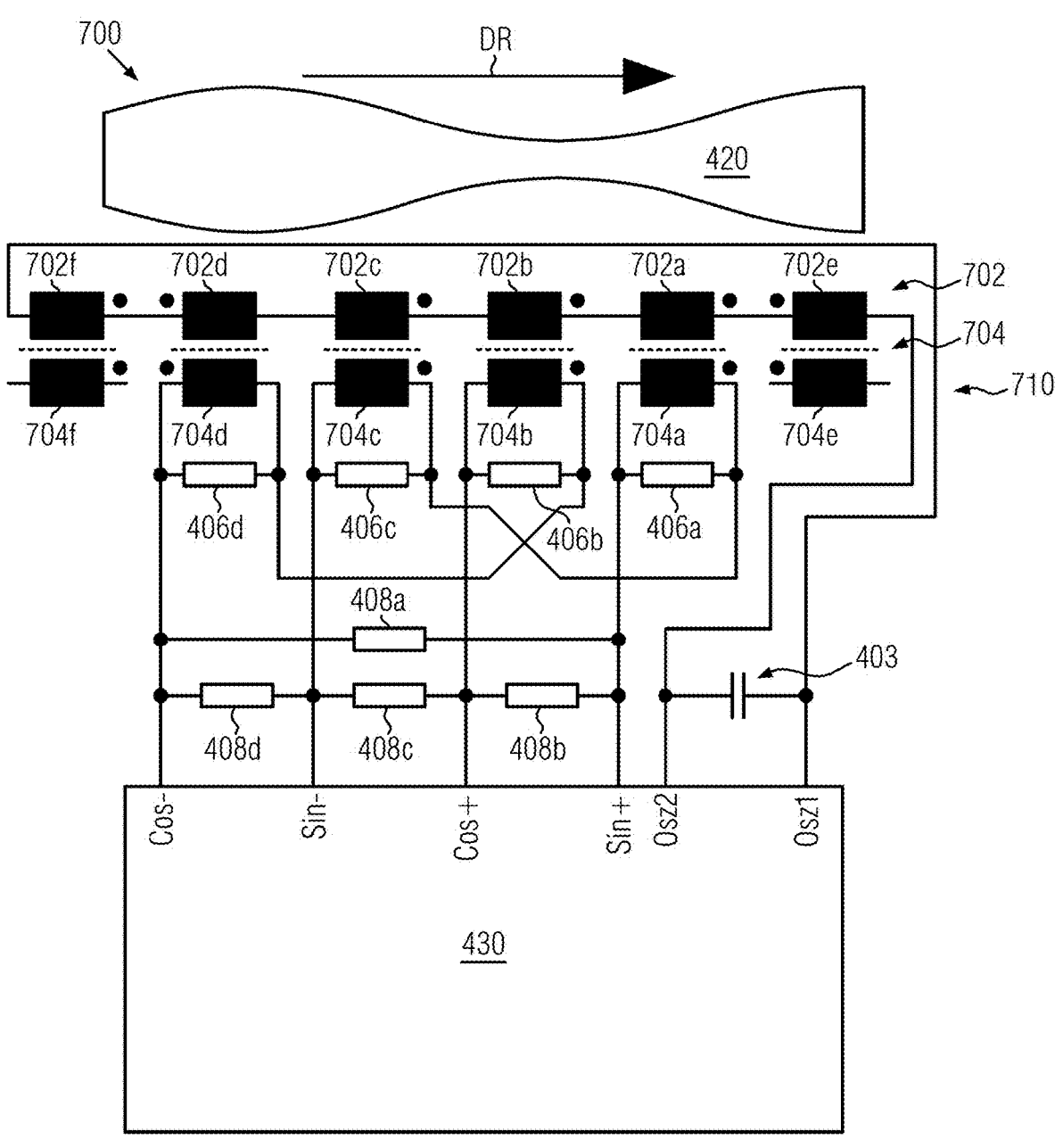
FIG. 12 schematically shows a circuit diagram of a detection system according to still further illustrative embodiments.

With regard to FIG. 12, further alternative embodiments to FIGS. 9 and 11 are now described, in which subsets are formed from secondary windings in order to provide a differential signal. Here, identical reference signs between FIGS. 9, 11 and 12 denote identical features, and reference is made to the description above for FIG. 9 for a description of these identical features.

FIG. 12 shows a detection system 700 that differs from the detection system 400 in FIG. 9 in that it includes a detection device 710. More specifically, the detection device 710 differs from the detection device 410 in FIG. 9 by having a plurality of primary windings 702 and a plurality of secondary windings 704, as will now be described in more detail below.

The plurality of primary windings 702 includes primary windings 702a, 702b, 702c, and 702d arranged in series, the primary windings 702a and 702c being wound in the same sense and arranged in series with each other such that current applied to an input terminal of the primary winding 702a flows through both windings in the same direction. Further, the primary windings 702b and 702d are arranged in series, wound in the same sense with respect to each other and arranged in series and wound in opposite senses relative to the primary windings 702a and 702c so that a current applied to the primary winding 702a flows in the primary windings 702b and 702d in opposite directions relative to the primary windings 702a and 702c. However, a current applied to an input terminal of the primary winding 702b flows through the two primary windings 702b and 702d in the same direction. The primary windings 702a to 704d are arranged in series and have an alternating winding orientation in this arrangement.

The plurality of secondary windings 704 has secondary windings 704a, 704b, 704c, and 704d arranged with respect to each other in an alternating winding orientation corresponding to the alternating winding orientation of the primary windings 702a to 702d, so that the secondary windings 704a and 704c are wound in the same sense relative to the primary windings 702a and 702c, the secondary windings 704b and 704d are wound in the same sense relative to the primary windings 702b and 704d, and the secondary windings 704a and 704c are wound in opposite senses relative to secondary windings 704b and 704d. An interconnection of the secondary windings 704a and 704c in the detection device 710 with the electronic circuit 430 is such that a magnetic flux density (not shown) generated by the primary winding 702a during operation of the detection device generates a current in the associated secondary winding 704a, which is applied by the secondary winding 704a to the secondary winding 704c and flows through it in the same direction relative to the current flow in the secondary winding 704a. However, since the primary winding 702c has the opposite winding sense compared to the secondary winding 704a, a magnetic field is generated by the primary winding 702c that induces an opposite flowing current in the secondary winding 704c, resulting, during operation of the detection device 710, in a differential signal between the input terminal and the output terminal of a subset formed by the secondary windings 704a and 704c. Accordingly, when the secondary windings 704b and 704d are interconnected in a subset of the detection device 710 with the electronic circuit 430, a magnetic flux density (not shown) generated by the primary winding 702b during operation of the detection device generates a current in the associated secondary winding 704b that is applied from the secondary winding 704b to the secondary winding 704d and flows through the latter in the same direction relative to the current flow in the secondary winding 704b. However, since in the coil pair consisting of the primary winding 702d and the secondary winding 704d the windings have a winding sense that is oriented in the opposite direction to the winding sense of the secondary winding 704b, here, during operation of the detection device 710, a current flowing in the opposite direction relative to the coil pair of the primary winding 702b and the secondary winding 704b is induced by the primary winding 702d in the secondary winding 704d, so that a differential signal between the input terminal and the output terminal of this subset of the secondary windings 704b and 704d is also generated here.

With reference to FIG. 12, coil pairs of primary winding with associated secondary winding are given by (702a, 704a) and (702b, 704b) and (702c, 704c) and (702d, 704d), where coil pairs (702a, 704a) and (702c, 704c) have windings wound in the same direction with respect to each other, and the coil pairs (702b, 704a) and (702d, 704c) have windings wound in the same direction with respect to each other that are opposite in direction or winding sense to the coil pairs (702a, 704a) and (702c, 704c). Further, the plurality of secondary windings 704 are divided into two subsets [704a, 704c] and [704b, 704d], wherein the windings in one subset are arranged in series with each other, and a current applied to the subset flows through them in the same direction.

With reference to FIG. 11, further illustrative embodiments are described, wherein additional coil pairs are added to the detection device 710 to provide symmetrical coupling of the end coil pairs formed by windings 702a, 704a, 702d and 704d. This allows avoidance of an offset in the signals output by the detection device 710 without requiring additional electrical components corresponding to resistors 406a to 406d and/or corresponding capacitors. On the other hand, additional secondary windings 704e and 704f are provided adjacent to the secondary windings 704a and 704d such that the secondary windings 704a and 704d are now each disposed between two secondary windings (704e and 704b in the case of the secondary winding 704a and 704f and 704c in the case of the secondary winding 704d). Thus, an expense of providing at least one suitably determined resistor and/or capacitor corresponding to elements 406a to 406d may be avoided at the expense of an additional space requirement for the additional primary windings 702e and 702f. With respect to secondary windings 704e and 704f, these may be unconnected so that active interconnection of these elements in a secondary winding circuit is not required, but the unconnected secondary windings 704e and 704f are each associated with a primary winding 702e and 702f, thus forming a coil pair.

With respect to additional primary windings 702e and 702f, these may be arranged in series with the existing primary windings 702a to 702d, so that a winding arrangement with alternating winding sense along the plurality of primary windings 702 is further realized.

The additional windings described with reference to FIG. 12 are not limited to the embodiment shown in FIG. 12, and may also be provided in connection with the embodiments shown in FIGS. 9 and 11 as described above. For example, with respect to FIG. 9, for this purpose, a copy of the coil pair (702f, 704f) of FIG. 12 may be formed on the right side of the coil pair (402a, 404a) in FIG. 9 and on the left side of the coil pair (402d, 404d) in FIG. 9 in accordance with the embodiment shown in FIG. 12. With respect to FIG. 11, a copy of the coil pair (702f, 704f) in FIG. 12 may be formed on the right side of the coil pair (602a, 604a) in FIG. 9 for this purpose, while a coil pair corresponding to the coil pair (602d, 604d) in FIG. 11 may be formed on the left side of the coil pair (602d, 604d) as an additional coil pair with an unconnected additional secondary winding.

With regard to FIGS. 9, 11 and 12, various embodiments are described, wherein primary windings and secondary windings are each coupled and/or interconnected with a particular winding sense or winding direction such that a magnetic field is generated in each of the primary windings associated with a subset of secondary windings, which induces a voltage in the respective associated secondary winding of the subset such that at terminal ends of the subset to the electronic circuit 430 a voltage difference is generated from the voltages that are correspondingly induced in the secondary windings.

Figure 13:
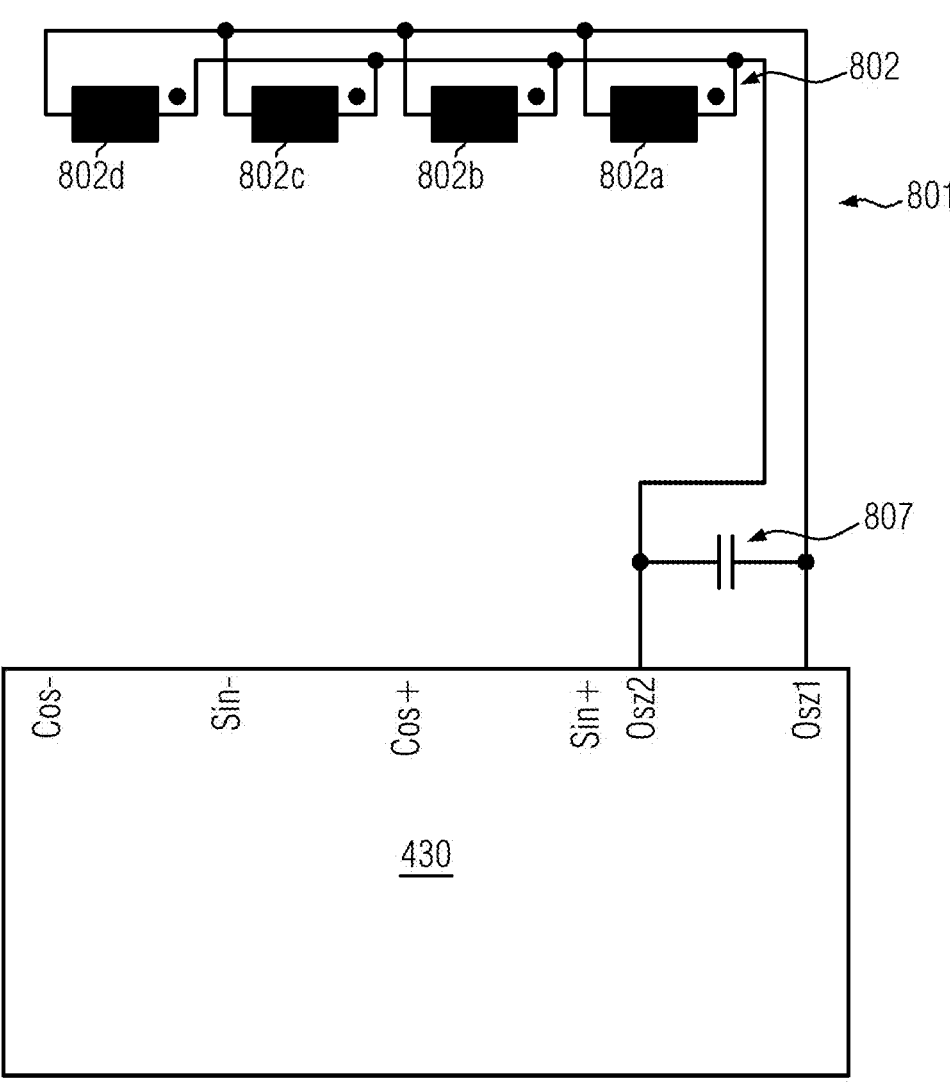
FIG. 13 schematically shows a circuit diagram of a plurality of primary windings according to some illustrative embodiments.

With reference to FIG. 13, a primary winding circuit 801 is shown according to some illustrative embodiments. The primary winding circuit 801 includes a plurality of primary windings 802 and a capacitor 807 connected to terminals Osz of the electronic circuit 430 already described above. The primary winding circuit 801 may include a resonator circuit having a resonant frequency determined by the plurality of primary windings 802 and the capacitor 807, and operated by the electronic circuit 430. For example, the electronic circuit 430 includes an electrical power source or is capable of providing electrical power at the terminals Osz such that electrical power is suitably supplied in the primary winding circuit 801.

With reference to FIG. 13, the plurality of primary windings 802 has a parallel connection of primary windings 802a to 802d. For example, the primary windings 802a to 802c are arranged in parallel with the primary winding 802d connected to the terminals.

The primary winding circuit 802 may be provided in a detection device as described above with reference to any one of FIGS. 9, 11 and 12, wherein the plurality of primary windings described above with reference to any one of FIGS. 9, 11 and 12 and the sensor structure is replaced by the plurality of primary windings 802 of FIG. 13. Alternatively, at least one of the primary windings 802a to 802d may replace at least one of the primary windings 402a to 402d in FIG. 9 or at least one of the primary windings 602a to 602d in FIG. 11 or at least one of the primary windings 702a to 702d, so that this at least one replaced primary winding in FIGS. 9, 11 and 12 is no longer arranged in series, but is arranged in parallel as shown in FIG. 13.

Figure 10:
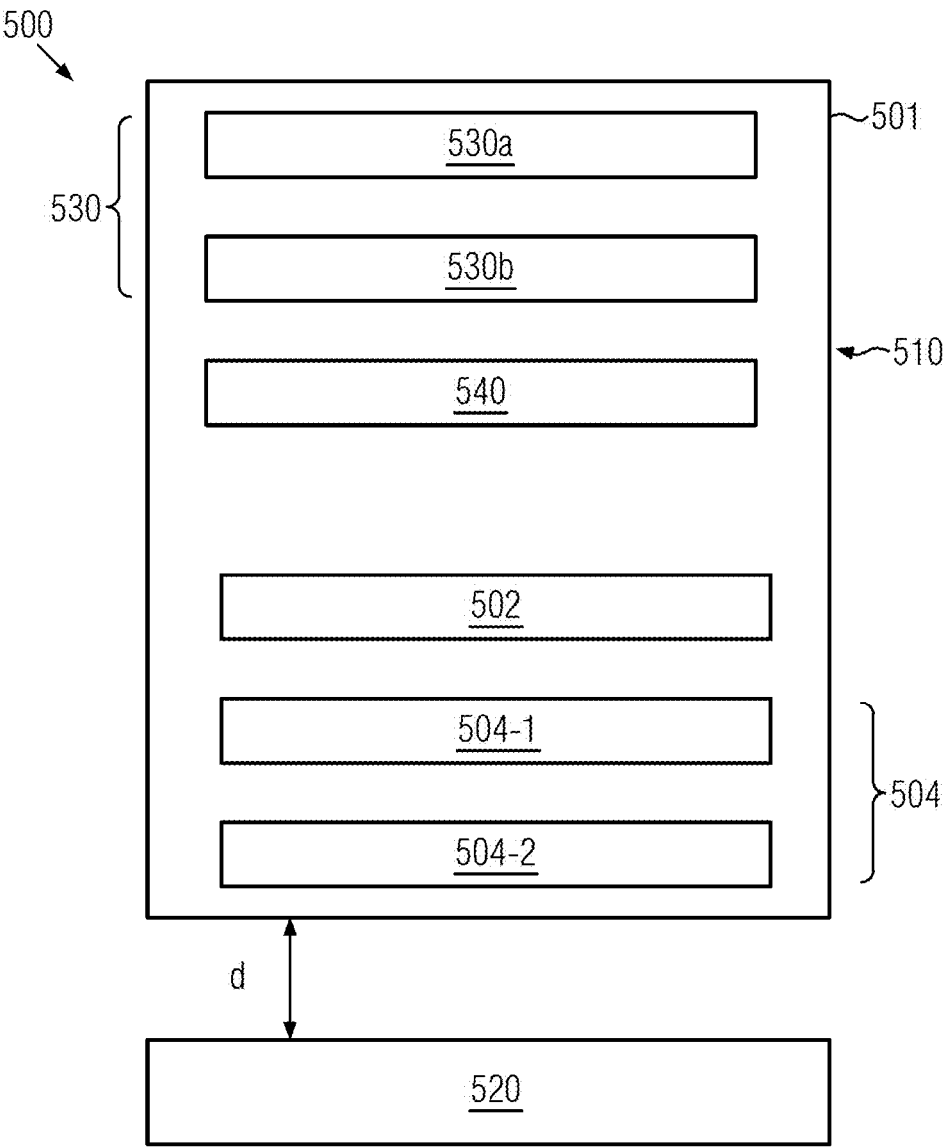
FIG. 10 schematically shows a sectional view of a detection system according to some illustrative embodiments, wherein a pair of coils is arranged in a printed circuit board.

With reference to FIG. 10, there is schematically shown a sectional view through a detection system 500 according to some illustrative embodiments, which may be used in a rotor position sensor, for example one of the rotor position sensors described with reference to FIGS. 1a, 1b and 2 above. The detection system includes a detection device 530 having a circuit board 501 and a sensor element 520 having a sensor structure (not shown). The sensor structure 520 and the detection device 510 are spaced apart from each other by a distance d. For example, d may be in a range of 0.5 mm to 5 mm, preferably in a range of 1 mm to 3 mm, more preferably in a range of 1.5 mm to 2.5 mm.

As schematically shown in FIG. 10, the circuit board 501 includes a primary winding 502 and a secondary winding 504. Optionally, as shown in FIG. 10, the circuit board 501 may further include an electronic circuit 530 that may be shielded from the windings 502 and 504 by an optional shield 540 (e.g., a foil or layer of an electrically conductive material that may be connected to a reference potential, such as ground, or may be unconnected or electrically floating).

In some illustrative embodiments, the printed circuit board 501 may be multi-layered such that the windings 502 and 504, the (optional) shield 540, and the electronic circuit 530 may be arranged in different layers on top of each other. Alternatively, the windings 502 and 504 may be integrated into a first printed circuit board element and the electronic circuit 530 into a separate second printed circuit board element, wherein both printed circuit board elements may be connected to each other via electrical connectors. Here, an orientation of a normal to a circuit board surface of the first circuit board element that corresponds to a winding surface of the first circuit board element may be substantially perpendicular to a surface normal of the second circuit board element. This configuration may be used in an application according to the rotor position sensor in FIG. 2.

In some illustrative embodiments, the electronic circuit 530 may be formed in multiple layers, such as formed in two planes with circuit layers 530a and 530b. In this regard, for example, circuit layer 530a may implement a portion of the secondary winding circuit including the resistors and capacitors described in the context of FIGS. 9, 11 and/or 12 above. For example, the circuit layer 530b may correspond to the electronic circuit 430 of at least one of FIGS. 9, 11, and 12.

As shown in FIG. 10, the secondary windings 504 may have multiple layers, for example including winding layers 504-1 and 504-2 or may have more layers. The winding layers 504-1 and 504-2 may be spaced apart from each other by, for example, 0.05 mm to 0.2 mm. For example, a distance may be about 100 μm.

Although the primary winding 502 is shown as a single layer in FIG. 10, this is not a limitation and instead the primary winding 502 may be formed with multiple layers. A distance between individual layers may be selected corresponding to a distance between individual winding layers of the secondary winding 504. The secondary winding 504 and the primary winding 502 may be spaced apart from each other by, for example, 0.05 mm to 0.2 mm. For example, a distance may be about 100 μm.

The primary winding 502 may be formed corresponding to a primary winding described above. For example, only a single primary winding may be formed in the circuit board 501 at the primary winding 502. Alternatively, the primary winding 502 may be a primary winding of a plurality of primary windings. In illustrative examples, and as described above in connection with some illustrative embodiments, the primary winding 502 may be arranged in a coil pair with the secondary winding 504. For example, a plurality of pairs of coils may be distributed in the circuit board 501 perpendicular to the drawing plane shown in the sectional view (corresponding to a thickness direction of the circuit board 501).

A distance in a range of about 1 mm to about 2 mm may be formed between the primary coil 502 and the (optional) shield 540. For example, a distance of about 1.7 mm may be present.

A distance between the (optional) shield 540 and the electronic circuit 530 may be selected in a range of about 0.05 mm to about 0.2 mm. For example, the distance may be about 100 μm.

A distance in a range of about 0.05 mm to 0.2 mm may be formed between individual layers of electronic circuit 530. For example, the distance may be about 100 μm.

With respect to the various illustrative embodiments above, windings are described in terms of primary and secondary windings. At least a portion of these windings may be formed as an air coil, for example. This means that no magnetizable core is provided.

With respect to some illustrative embodiments, "sinusoidal" coils are described above. In this context, the term "sinusoidal" is also considered to include a "cosinusoidal" shape, since sine and cosine for an angle φ are known to differ by a phase shift of 90°: cos φ=sin (φ+90°).

The term "essentially" is intended to express that deviations and modifications are also possible, which have little or no influence on the function or the effect to be achieved. In this context, deviations in a range of 50%, for example of at most 25% or of at most 15% or of at most 10% or of at most 5% or of at most 1% are considered tolerable.

With regard to various embodiments of a detection device with secondary windings connected in a subset, it may generally be inferred from the above description that primary windings and secondary windings are each coupled and/or connected with a specific winding sense or winding direction, respectively, in such a way that the primary windings are connected to the secondary windings. In general, it is understood from the above description that primary windings and secondary windings may each be coupled and/or interconnected with a particular winding sense such that a magnetic field is generated in each of the primary windings associated with a particular subset of secondary windings, which in turn induces a voltage in the respective associated secondary winding of that particular subset such that a voltage difference occurs at terminal ends of that particular subset to the electronic circuit 430 from the voltages induced in the individual secondary windings of that particular subset.

Various embodiments of a detection device for a position sensor are disclosed in this description, such as a rotor position sensor or, in general, a position sensor that detects not a position of a rotor of an electric machine but a position of any rotating part, such as a part flanged to a rotor of an electric machine via a gear, for example, or a rotating part that rotates only in a limited angular range or continuously.

In some of these illustrative embodiments, this detection device includes a printed circuit board, a plurality of primary windings, and a plurality of secondary windings, wherein the plurality of primary windings and/or the plurality of secondary windings are integrated into or attached to the printed circuit board, and wherein one primary winding and one secondary winding are each arranged in a coil pair such that the windings in each coil pair have a maximum inductive coupling compared to an inductive coupling between a winding from that coil pair and a winding from another coil pair. In illustrative examples herein, the secondary windings may be at least partially interconnected in the printed circuit board in a secondary winding circuit with other electrical and/or electronic components integrated into the printed circuit board, or the secondary windings may be provided unconnected in the printed circuit board such that interconnection of the secondary windings occurs via electrical and/or electronic components externally connected to the printed circuit board. Additionally or alternatively, the primary windings may be at least partially interconnected with further electrical and/or electronic components integrated in the printed circuit board, or the primary windings may be provided unconnected in the printed circuit board, so that an interconnection of the secondary windings takes place via electrical and/or electronic components that are connected to the printed circuit board from the outside. This detection device may be designed more compactly due to the individual coil pairs, since a large-area coil design is avoided by the coil pairs, so that a corresponding detection device may be designed more compactly. Furthermore, the avoidance of large-area coils increases the immunity of the detection device to electromagnetic fields, since smaller coil areas are provided, so that fewer interference fields are trapped here by the windings. In addition, the coil pairs have improved coupling compared to an arrangement with coils with a large-area coil design, so that less amplification is required here for the measurement signals induced in the secondary windings, which contributes to a compact design of detection devices. This makes it possible to better adapt the detection device to given installation spaces and/or to make optimum use of given installation spaces, for example by integrating further components into the given installation spaces in addition to the detection device. On the other hand, the coil pairs allow for improved EMC, since a compact design allows for less radiation from the detection device.

In further such embodiments, the windings from each coil pair may be arranged opposite each other in a thickness direction of the printed circuit board, and the coil pairs may be arranged in a distributed manner transversely to the thickness direction. This represents an advantageous embodiment of the coil pairs in the printed circuit board, allowing for improved coupling between the windings in each coil pair, on the one hand, and low crosstalk between the coil pairs, on the other hand, while providing a compact embodiment of the printed circuit board.

In further such embodiments, the secondary windings may be rectangular coils. In this regard, rectangular coils may be provided in a very simple manner with a small coil area. In this context, a coil area means an area surrounded by the turn(s) of a winding in a top view of the winding parallel to the winding axis.

In further such embodiments, the secondary windings in a secondary winding circuit may be divided into a first subset and a second subset, with only the secondary windings in each subset being arranged in series with each other. The secondary winding circuit may further include a first resistor arranged in parallel with a first secondary winding from the first subset, and a second resistor arranged in parallel with a first secondary winding from the second subset. The first resistor and the second resistor allow offset matching to be achieved. In detection devices, in which the secondary windings are not arranged uniformly over a full circle about an axis, an offset occurs in signals output by the secondary windings due to the necessarily asymmetrical arrangement of the secondary windings about the axis. Alternatively, a capacitor may be provided instead of the first resistor and/or a capacitor may be provided instead of the second resistor. Further, only one of the first resistor and the second resistor may be provided so that offset matching is achieved only in one subset, and a capacitor may be provided instead of this resistor so that offset matching is achieved by a capacitor only in one subset. In a special illustrative example of the fourth embodiment, at least one resistor and/or at least one capacitor may be integrated into an integrated circuit within the printed circuit board.

In further such embodiments, the secondary winding circuit may further include a first capacitor and a second capacitor, wherein the first capacitor is arranged in parallel with a second secondary winding from the first subset and the second capacitor is arranged in parallel with a second secondary winding from the second subset. This may increase temperature stability in each subset in the case of a combination of the first resistor and the first capacitor in the first subset and the second resistor and the second capacitor in the second subset. Alternatively, only one of the first capacitor and the second capacitor may be provided so that improved temperature stability is achieved in only one subset. In one particular illustrative example of this advantageous embodiment of the fourth embodiment, at least one resistor and/or at least one capacitor may be integrated into an integrated circuit within the printed circuit board.

In further such embodiments, the secondary winding circuit may further include an additional resistor or capacitor disposed between a secondary winding from the first subset and a secondary winding from the second subset. This may also be an alternative to the fifth embodiment ("alternative fifth embodiment"), wherein instead of the first and/or second resistor (or capacitor) or instead of both resistors (or capacitors), the additional resistor or additional capacitor is further provided. By means of the additional resistor or additional capacitor, a phase balance between the individual subsets may be achieved. Thereby a phase offset is balanced, which occurs owing to the windings having differently strong couplings to the windings of adjacent coil pairs. Again, improved temperature stability may further be achieved by a combination of a capacitor and a resistor, each arranged between a winding of the first subset and a winding of the second subset. In a particular illustrative example of this other advantageous embodiment of the fourth embodiment, at least one resistor and/or at least one capacitor may be integrated into an integrated circuit within the printed circuit board.

In further such embodiments, the first subset and the second subset may each have two secondary windings with opposite winding directions. This provides an output of differential output signals for the subsets in the secondary winding circuit so that, for example, spurious signals interspersed across the secondary windings may be compensated.

In the context of the embodiments described, at least one of the primary windings and at least one secondary winding may be formed as an air core coil, as described above.

Although applications are described with reference to the figures, which relate to a rotor position sensor, this is not a limitation. Instead of a rotor position sensor, the disclosure may be applied to a position sensor that does not directly detect a position of a rotor of an electric machine, but detects a position of any rotating part, such as a part that is flanged to a rotor of an electric machine via a gearbox, for example, or a rotating part that rotates only in a limited angular range or continuously, such as any rotating actuator.

With respect to FIG. 14*a* to 14*d*, modifications of the embodiment described above with respect to FIG. 11 are illustrated, where common reference numbers denote common elements as described above in the context of FIG. 11 and the disclosure of which is incorporated by its entirety by reference.

Figure 14A:
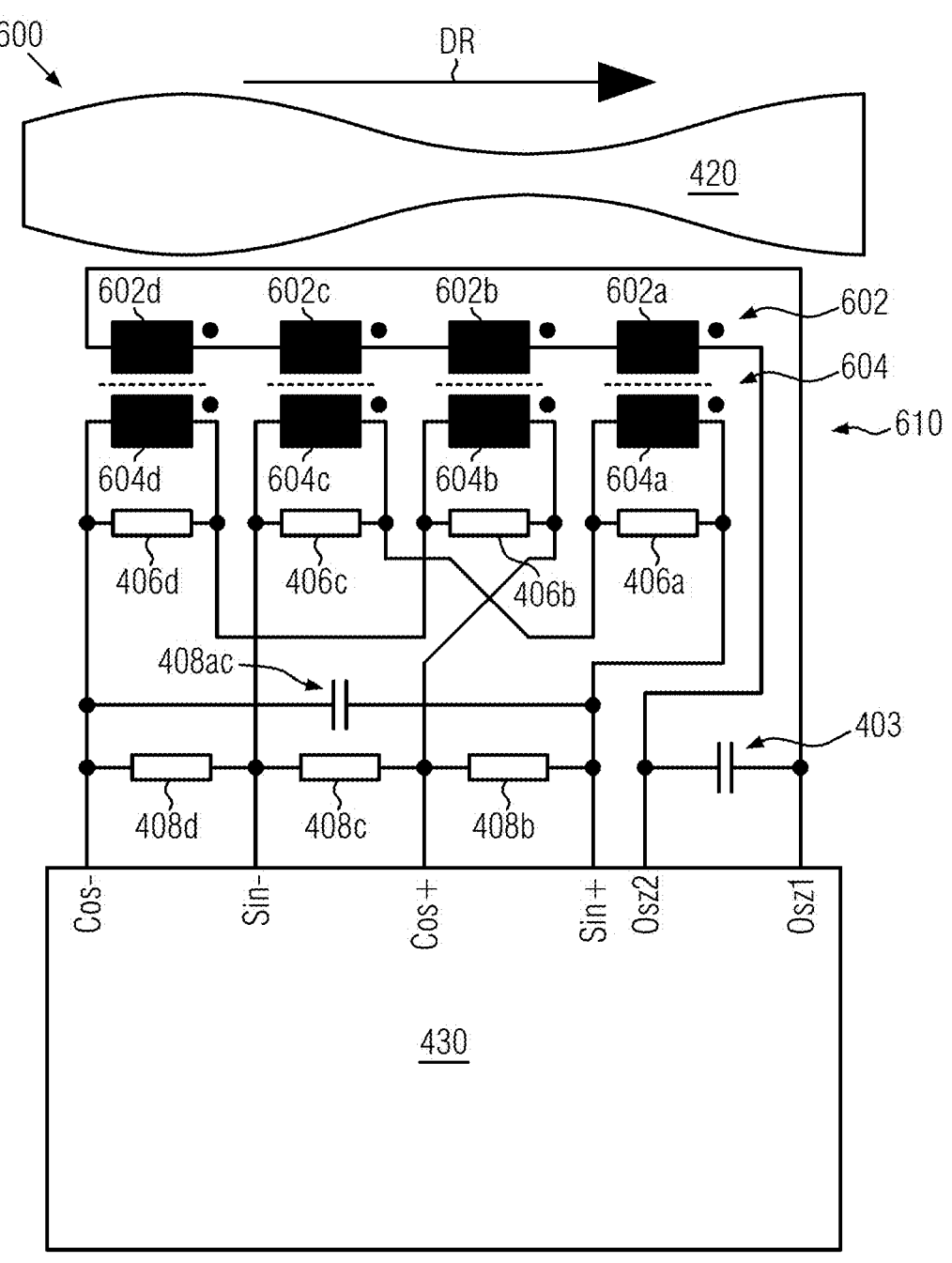
FIG. 14a-d schematically show modifications of the embodiment described with respect to FIG. 11.

FIG. 14*a* shows the detection system 600 where the secondary winding circuit further includes a capacitor 408*ac* disposed between the secondary winding 604*a* and the secondary winding 604*d*.

Figure 14B:
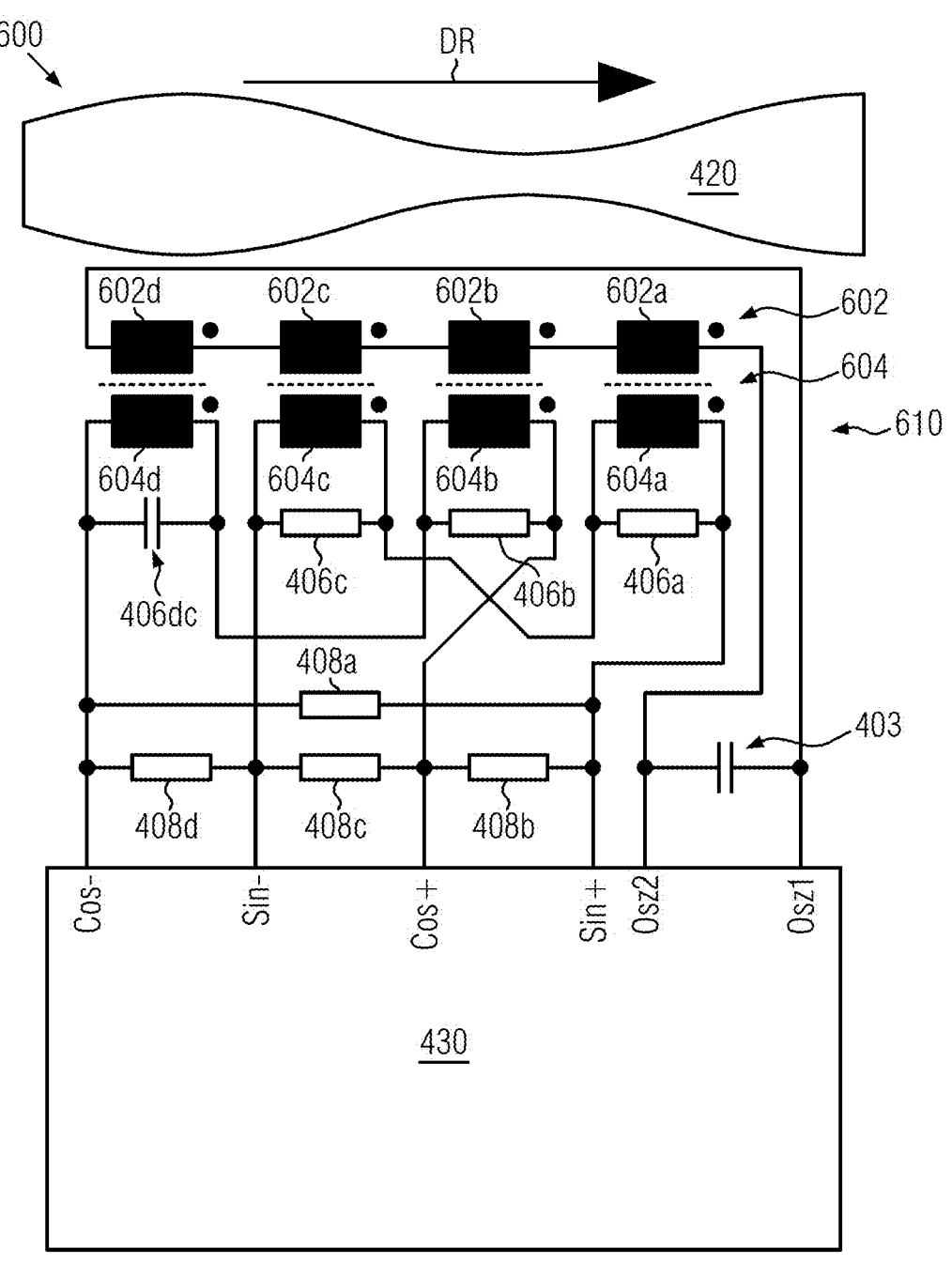

FIG. 14*b* shows the detection system 600 where the secondary winding circuit further includes a capacitor 406*dc* arranged in parallel with the second secondary winding 604*d*.

Figure 14C:
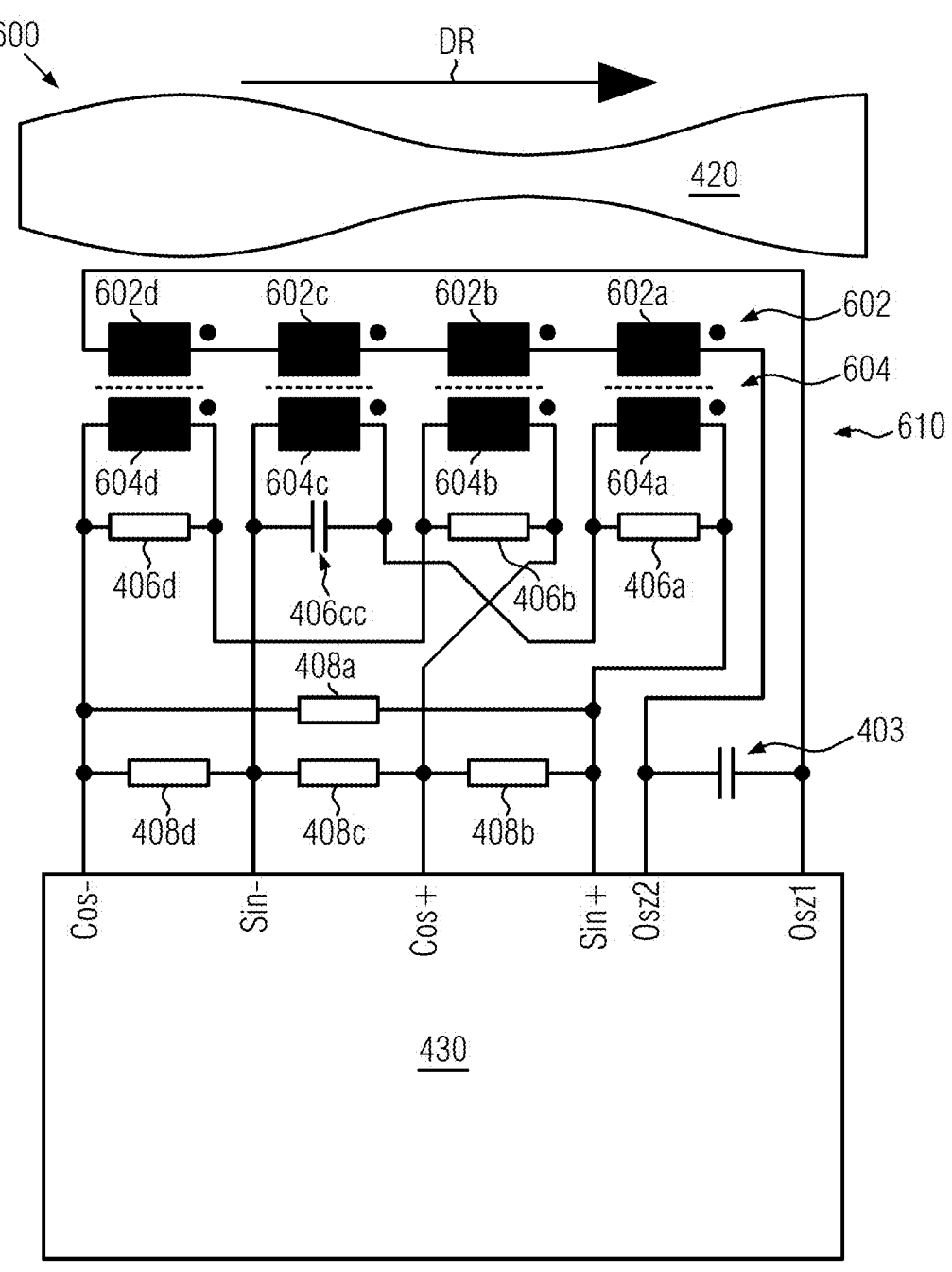

FIG. 14*c* shows the detection system 600 where the secondary winding circuit further includes a capacitor 406*cc* arranged in parallel with the second secondary winding 604*c*.

Figure 14D:
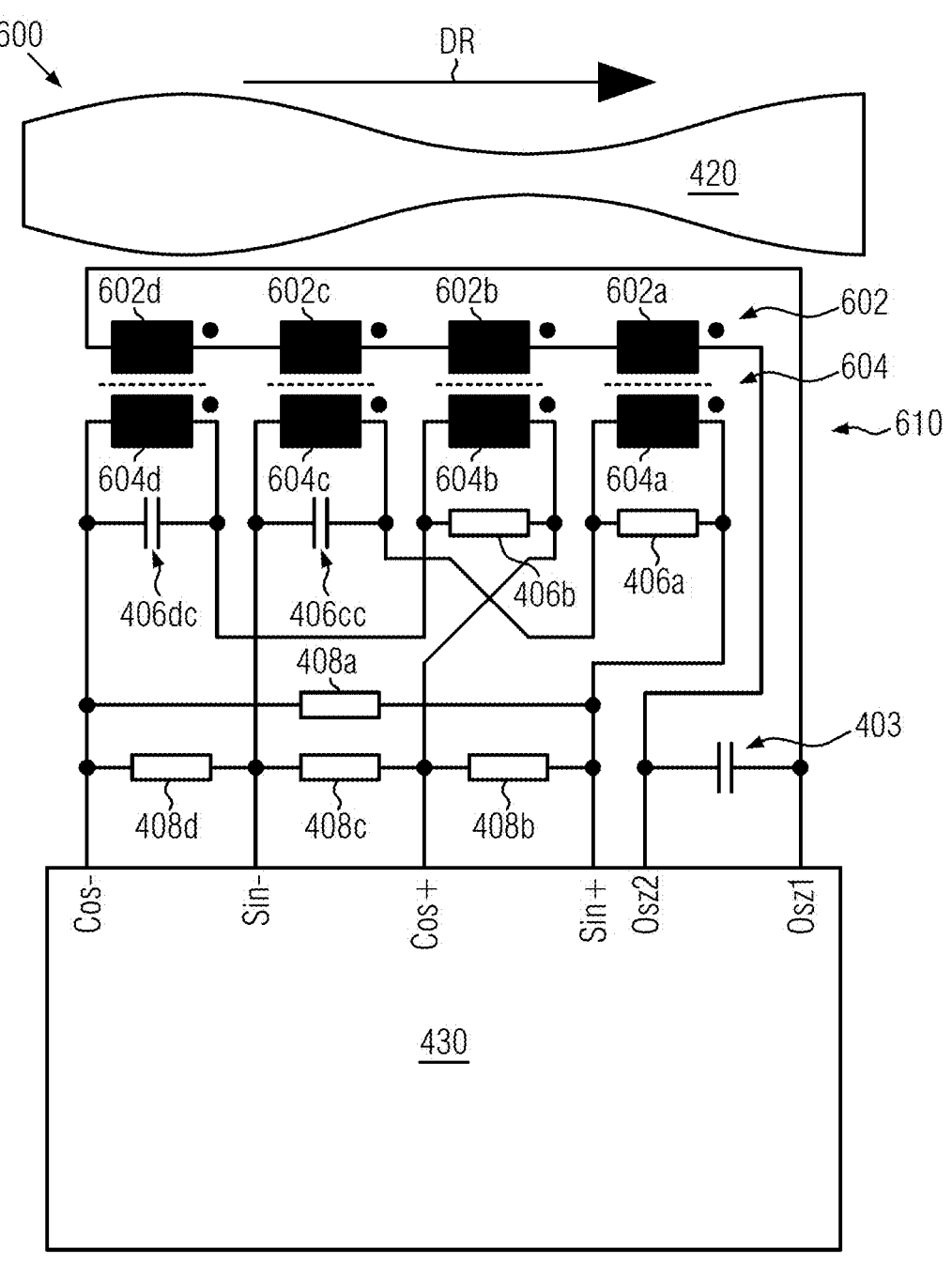

FIG. 14*d* shows the detection system 600 where the secondary winding circuit according to FIGS. 14*b* and 14*c* are combined in that the secondary winding circuit further includes the capacitor 406*dc* arranged in parallel with the second secondary winding 604*d* and the capacitor 406*cc* arranged in parallel with the second secondary winding 604*c*.

The invention claimed is:

1. A detection device for a position sensor, comprising:
a primary winding; and
a secondary winding circuit having a plurality of secondary windings inductively coupled to the primary winding during operation of the detection device;
wherein the plurality of secondary windings is formed as two sinusoidal coils routed in an overlapping arrangement, each having a center tap provided as a vertical contact of a printed circuit board, and wherein the detection device is configured, for each sinusoidal coil, to tap voltage signals of both half-coils using the center tap as a common node together with, respectively, a first end terminal and a second end terminal of that sinusoidal coil.

2. A detection device according to claim 1, wherein the primary winding is formed as a rectangular coil surrounding the plurality of secondary windings in plan view.

3. A detection device according to claim 1, wherein the plurality of secondary windings comprises a first subset of at least two secondary windings arranged in series with each other and a second subset of at least two secondary windings arranged in series with each other.

4. A detection device of claim 3, further comprising a resistor or capacitor disposed between a secondary winding of the first subset and a secondary winding of the second subset.

5. A detection device according to claim 3, wherein said secondary winding circuit further comprises a first resistor arranged in parallel with a first secondary winding from said first subset and a second resistor arranged in parallel with a first secondary winding from said second subset.

6. A detection device according to claim 3, wherein the secondary windings in each subset are arranged in the secondary winding circuit in a connected manner relative to the at least one primary winding so as to provide a differential signal from each subset during operation of the detection device.

7. A detection device according to claim 3, wherein the secondary winding circuit further comprises a first capacitor and a second capacitor, the first capacitor being arranged in parallel with a second secondary winding from the first subset and the second capacitor being arranged in parallel with a second secondary winding from the second subset.

8. A detection device according to claim 1, wherein the primary winding and the secondary winding circuit are integrated in a printed circuit board.

9. A detection system comprising:
a detection device according to claim 1; and
a sensor element rotatably arranged relative to the detection device;
wherein the sensor element comprises a sensor structure formed of an electrically conductive material.

10. A detection device for a position sensor, comprising:
a primary winding; and
a secondary winding circuit having a plurality of secondary windings inductively coupled to the at least one primary winding during operation of the detection device;
wherein the plurality of secondary windings comprises a first subset of at least two secondary windings and a second subset of at least two secondary windings arranged in series with each other; and
wherein the secondary winding circuit further comprises a first resistor or capacitor arranged between a secondary winding from the first subset and a secondary winding from the second subset or arranged in parallel with a first secondary winding from the first subset or the second subset;
wherein the plurality of secondary windings is formed as two sinusoidal coils routed in an overlapping arrangement, each having a center tap provided as a vertical contact of a printed circuit board, and wherein the detection device is configured, for each sinusoidal coil, to tap voltage signals of both half-coils using the center tap as a common node together with, respectively, a first end terminal and a second end terminal of that sinusoidal coil, and
wherein only one primary winding is provided, which is formed as a rectangular coil and surrounds the secondary windings in plan view.

11. A detection device according to claim 10, wherein the primary winding and the secondary winding circuit are integrated in a printed circuit board.

12. A detection device according to claim 10, wherein the secondary winding circuit further comprises an additional resistor or additional capacitor arranged between two other secondary windings, one of which being from the first subset and the other one being from the second subset.

13. A detection system comprising:
a detection device according to claim 10; and
a sensor element rotatably arranged relative to the detection device;
wherein the sensor element comprises a sensor structure formed of an electrically conductive material.

14. A detection device for a position sensor, comprising:
at least one primary winding; and
a secondary winding circuit having a plurality of secondary windings inductively coupled to the at least one primary winding during operation of the detection device;
wherein the plurality of secondary windings comprises a first subset of at least two secondary windings and a second subset of at least two secondary windings arranged in series with each other; and
wherein the secondary winding circuit further comprises a first resistor or capacitor arranged between a secondary winding from the first subset and a secondary winding from the second subset or arranged in parallel with a first secondary winding from the first subset or the second subset, wherein the at least one primary winding and the secondary winding circuit are integrated in a printed circuit board, and wherein a number of the at least one primary winding and a number of the plurality of secondary windings are the same, and in the printed circuit board, each primary winding is assigned to one secondary winding.

15. A detection system comprising:

a detection device according to claim 14; and a sensor element rotatably arranged relative to the detection device;

wherein the sensor element comprises a sensor structure formed of an electrically conductive material.

* * * * *